US011604824B2

(12) United States Patent
Rahman et al.

(10) Patent No.: US 11,604,824 B2
(45) Date of Patent: Mar. 14, 2023

(54) SYSTEM AND METHOD OF MANAGING USER ENGAGEMENT WITH A MUSICAL PLAYLIST

(71) Applicants: Mohammed Mizan Rahman, London (GB); Min Soe Hein Aung, Prescot (GB)

(72) Inventors: Mohammed Mizan Rahman, London (GB); Min Soe Hein Aung, Prescot (GB)

(\*) Notice: Subject to any disclaimer, the term of this patent is extended or adjusted under 35 U.S.C. 154(b) by 219 days.

(21) Appl. No.: 17/105,491

(22) Filed: Nov. 25, 2020

(65) Prior Publication Data
US 2021/0157836 A1   May 27, 2021

Related U.S. Application Data

(60) Provisional application No. 62/940,168, filed on Nov. 25, 2019.

(51) Int. Cl.
*G06F 16/638* (2019.01)
*G06F 3/16* (2006.01)
*G06F 16/635* (2019.01)

(52) U.S. Cl.
CPC ............ *G06F 16/639* (2019.01); *G06F 3/165* (2013.01); *G06F 16/637* (2019.01)

(58) Field of Classification Search
CPC ....... G06F 16/639; G06F 16/637; G06F 3/165
See application file for complete search history.

(56) References Cited

U.S. PATENT DOCUMENTS

| 2014/0214188 A1* | 7/2014 | Knox | H04H 60/80 |
| | | | 700/94 |
| 2020/0129728 A1* | 4/2020 | Pinkerton | G09B 19/00 |

\* cited by examiner

*Primary Examiner* — Minh Chau Nguyen

(57) ABSTRACT

A system and method of managing user engagement with a musical playlist provides feedback for a host and allows attendees to directly engage with the host to adjust a playlist for an event or social gathering. The system includes at least one remote server, a corresponding user personal computing (PC) device, and a corresponding host PC device. The method begins by prompting the at least one host account to initiate an event session for a plurality of attendee accounts and then to designate a plurality of playlist songs with the corresponding host PC device. The event session is managed in between the host account and the plurality of attendee accounts through the remote server. A current song is played during the event session and feedback is relayed for the current song with the corresponding user PC device. The feedback is then outputted with the corresponding host PC device.

20 Claims, 22 Drawing Sheets

SYSTEM AND METHOD OF MANAGING USER ENGAGEMENT WITH A MUSICAL PLAYLIST

The current application claims a priority to the U.S. provisional patent application Ser. No. 62/940,168 filed on Nov. 25, 2019.

FIELD OF THE INVENTION

The present invention generally relates to data processing. More specifically, the present invention facilitates the generation of a musical playlist for a social gathering and continuously tracking engagement of individuals present in the social gathering.

BACKGROUND OF THE INVENTION

Communal spaces whether public or private may be a major part of the lives of individuals. Further, the communal spaces may be places for a social gathering. Very often music may be played in such communal spaces such as bars, clubs, retail spaces, lobbies, waiting areas, private properties, vehicles, etc. Further, the individual may have tastes and preferences for music. Further, the individuals may have a positive experience when the individuals listen to music according to the tastes and the preferences associated with the individuals. Conversely, when the individuals listen to music not according to the tastes and the preference associated with the individuals may lead to an increase in the likelihood of a less positive experience. Further, the standard music system may be automated and/or controlled by a person. Further, the person that may control the standard music system may be refer to as Disc Jockey (DJ). Further, the standard music system may be used to play music in at least one of a place, an event, etc. Further, the standard music system may be used to play music in clubs, bars, etc. Further, the standard music system may be used to play music in private events, home hosts, etc. Further, the music played by the standard music system may not have any knowledge of the taste and musical preference of the people that may be present in the vicinity of the standard music system, in an automated way. Further, the music selection for playing on the standard music system may be done according to the choices of the system controller that may control the standard music system. Further, the choices of the system controller may include tastes and preferences associated with the system controller. Further, the choices of the system controller may include guesses as to what might be well received by the audience.

Further, a few people may directly request specific songs (tracks) with the standard music system. Further, the specific songs (tracks) may be based on the desire of one or a few people. Further, requesting songs (tracks) directly with the standard music system may not take into account the preferences and tastes of most people in the relevant vicinity of the standard music system, in an automated way. Further, current music playing systems may not be able to optimize a playing selection associated with the music selections to be jointly preferred by everyone in the vicinity of the music playing system in real-time, in an automated way. Further, the music playing system may not have a method to optimize the playing selection in a seamless and a passive way with little active involvement by the audience. Further, the standard music system may not include automated passive feedback methods to receive feedback on the playing selection. Further, the automated passive feedback methods may not require the people to proactively provide the feedback. Further, the standard music system may not allow optimization of the playing selection associated with a host.

Therefore, there is a need for improved methods and systems facilitating the generation of a playlist for a social gathering and continuously tracking engagement of individuals present in the social gathering that may overcome one or more of the above-mentioned problems and/or limitations.

DETAIL DESCRIPTIONS OF THE INVENTION

All illustrations of the drawings are for the purpose of describing selected versions of the present invention and are not intended to limit the scope of the present invention.

Figure 1:
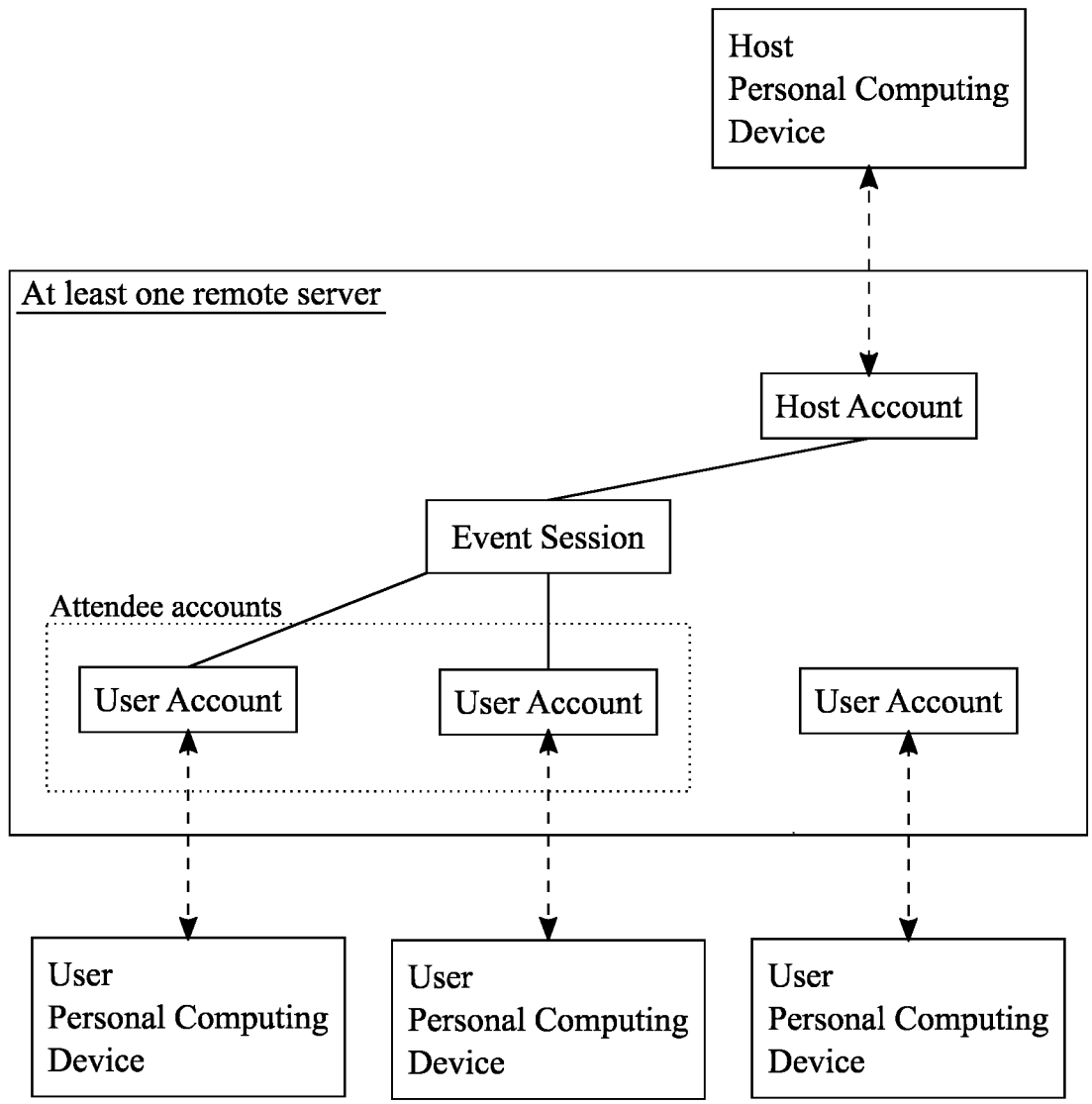
FIG. 1 is a block diagram illustrating the system of the present invention.

The present invention is a system and method managing user engagement with a musical playlist. Thus, the physical system used to implement the method for the present invention includes at least one remote server and a corresponding user personal computing (PC) device, as seen in FIG. 1. A plurality of user accounts is managed by the at least one remote server, wherein each user account is associated with the corresponding user PC device (Step A). Each user account is for an individual interested in attending an event such as a concert, a party, a night out, and so on. Any of the user accounts can be included as a member of the audience for the specific event. Furthermore, as the event is associated with a musical playlist, at least one host account is managed by the remoter server, wherein the host account is associated with a corresponding host PC device (Step B). The at least one host account is for a disc jockey (DJ), a master of ceremonies (MC), or a host of a party or gathering. The at least one host account manages the musical playlist at the event held for the entertainment of the plurality of user accounts. Any data associated with the plurality of user accounts and the at least one host account are stored on the at least one remote server and can be accessed through the corresponding user PC device and/or the corresponding host PC device. A PC device can be, but is not limited to, a computerized mobile phone (i.e. a "smartphone), a laptop, a tablet PC, a desktop, or a computerized watch (i.e. a "smartwatch").

Figure 2:
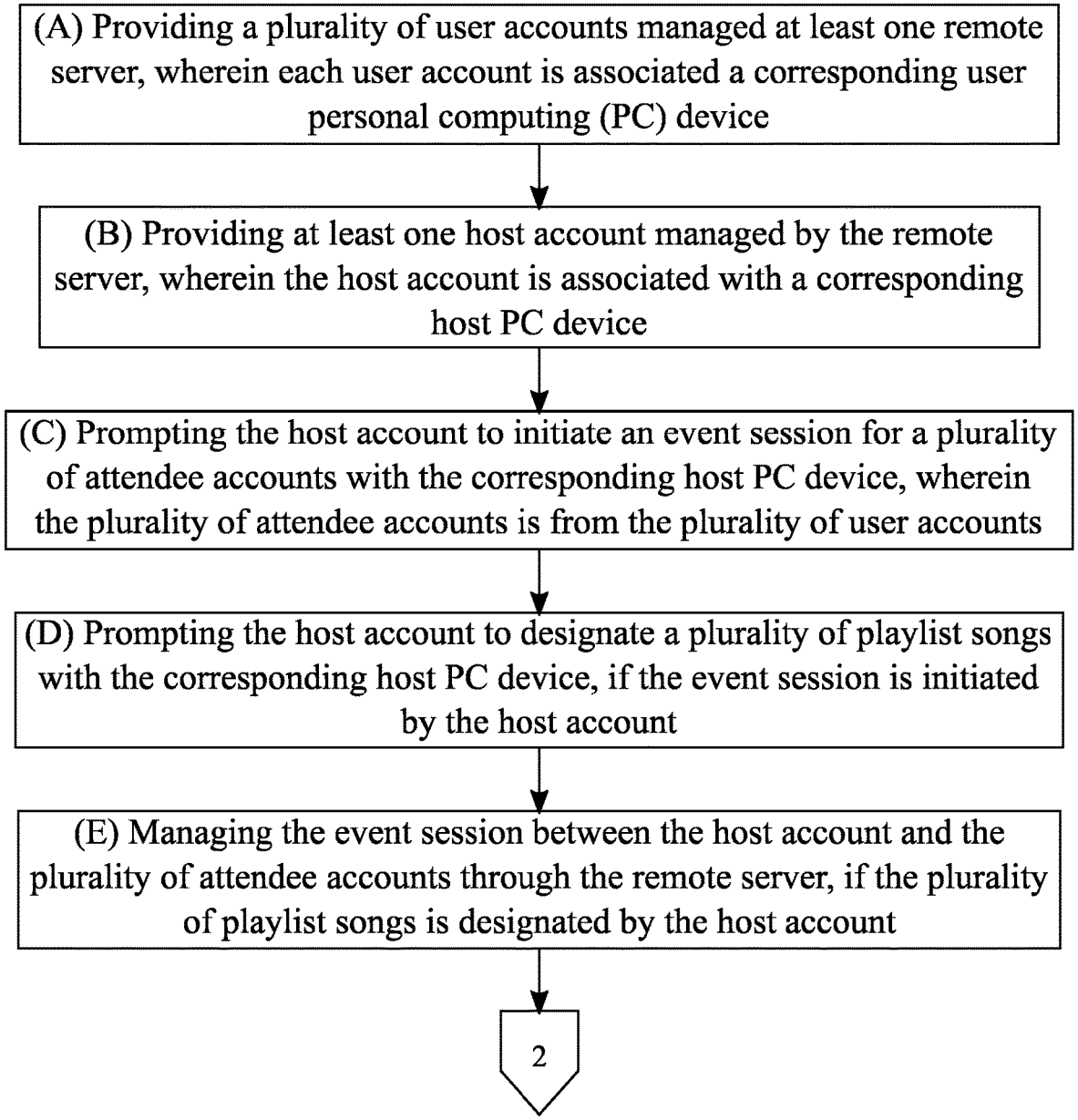
FIG. 2 is a flowchart illustrating the overall process for the method of the present invention.

The overall process for the method of the present invention includes the following steps that are implemented with the at least one remote server, the plurality of user PC devices, and the corresponding host PC device. As seen in FIG. 2, the overall process begins by prompting the host account to initiate an event session for a plurality of attendee accounts with the corresponding host PC device (Step C), wherein the plurality of attendee accounts is from the plurality of user accounts, thereby allowing the host account is able to define the event session for the plurality of attendee accounts. The event session is any social gathering with music playing in the background or music as the main attraction. The event session may be, but is not limited to, a birthday party, a music festival, and a wedding. The plurality of attendee accounts are users that have chosen be part of the event session. The event session has music continuously playing according to the liking of the host account as the host account is prompted to designate a plurality of playlist songs with the corresponding host PC device, if the event session is initiated by the host account (Step D). The plurality of playlist songs is the set of songs the host account believes to best fit the atmosphere and theme of the event session. The event session is then managed in between the host account the plurality of attendee accounts through the remote server, if the plurality of playlist songs is designated by the host account (Step E). The plurality of attendee accounts is therefore able to engage with the host account through the present invention to provide a more appropriate plurality of playlist songs for the event session.

Figure 3:
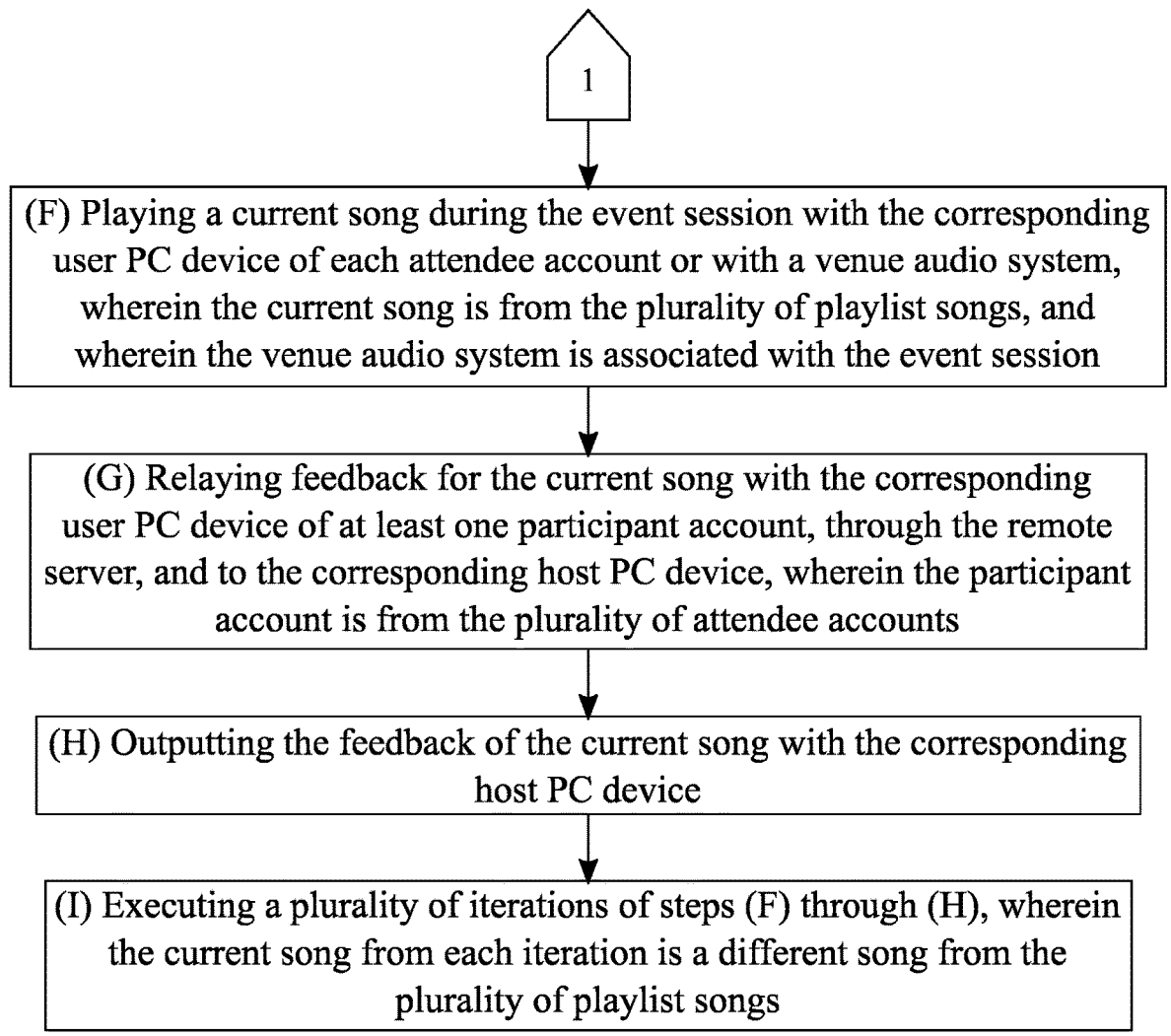
FIG. 3 is a flowchart illustrating a continuation of the flowchart in FIG. 2.

As the event session may be attended virtually or in-person, a current song is played during the event session with the corresponding user PC device of each attendee account or with a venue audio system, wherein the current song is from the plurality of playlist songs, and wherein the venue audio system is associated with the event session (Step F), seen in FIG. 3. The venue audio system is the physical audio system associated with the venue of the event session. The venue audio system may be a personal speaker system or a music hall speaker system. The plurality of playlist songs continuously becomes more accurate to the liking of the plurality of attendee accounts throughout the duration of the event session as feedback for the current song is relayed with the corresponding user PC device of at least one participant account, through the remote server, and to the corresponding host PC device, wherein the participant account is from the plurality of attendee accounts (Step G). Feedback from the plurality of attendee accounts preferably includes active and passive responses from the plurality of attendee accounts. The feedback of the current song is outputted with the corresponding host PC device (Step H), thereby allowing the host account to adjust the plurality of playlist songs accordingly and provide the most appropriate and desired music for the event session. Moreover, the remote server is able to order and/or edit the plurality of playlist songs based on the feedback, randomizing the plurality of playlist songs. In order to provide the desired music throughout the duration of the event session, the plurality of iterations of Step F through Step H is executed, wherein the current song from each iteration is a different song from the plurality of playlist songs (Step I).

Figure 4:
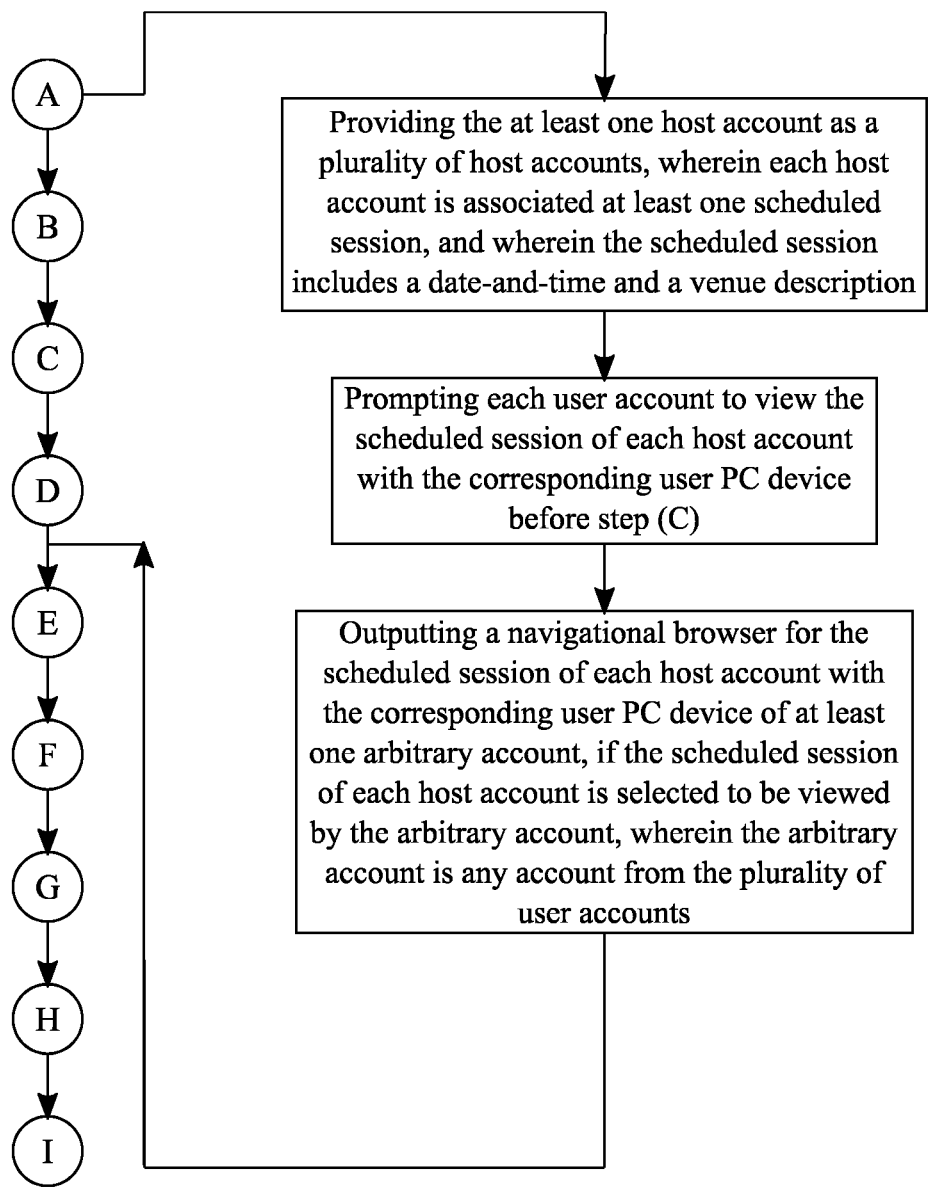
FIG. 4 is a flowchart illustrating a subprocess for outputting a navigational browser for a scheduled session of each host account.

Each user account is able to select which event session to join based on a specific host as the at least one host account is provided as a plurality of host accounts, wherein each host account is associated at least one scheduled session, wherein the scheduled session includes a date-and-time and a venue description, seen in FIG. 4. The plurality of host accounts may be multiple DJ's performing within a vicinity, multiple artists and DJ's performing at a festival or venue, and so on. The at least one scheduled session for each host account allows the user to plan and make time for a desired event session. The at least one scheduled session also allows the plurality of host accounts to perform according to their own personal schedules and coordinate with other host accounts as needed. The date-and-time associates each scheduled session with a specific date and time. Similarly, the venue description provides location information such as an address, venue type, venue capacity, and so on. Each user account is prompted to view the scheduled session of each host account with the corresponding user PC device before Step C in order to prepare and make the appropriate plans to attend a desired event session. In order to view and evaluate the scheduled session for each host account, a navigational browser is outputted for the scheduled session of each host account with the corresponding user PC device of at least one arbitrary account, if the scheduled session of each host account is selected to be viewed by the arbitrary account, wherein the arbitrary account is any account from the plurality of user accounts. The navigational browser may provide a plurality of tabs and links that categorize and present the scheduled session of each host account.

Figure 5:
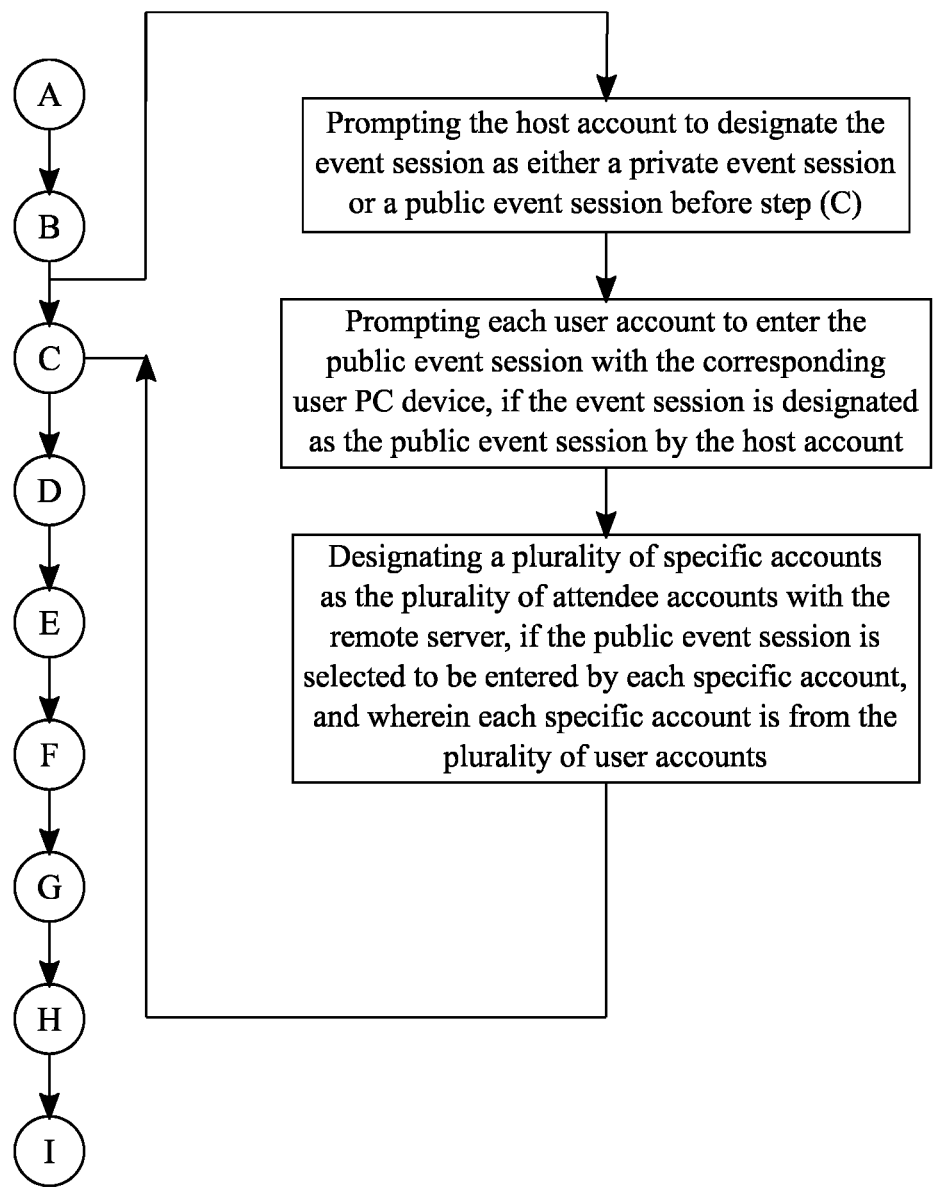
FIG. 5 is a flowchart illustrating a subprocess for allowing user accounts to virtually join an event session as attendee accounts.

As each event session accommodates a variety of social gatherings, the host account is prompted to designate the event session as either a private event session or a public event session before Step C, seen in FIG. 5. The private event session is typically a small gathering or a limited-attendance gathering based on payment or association. The public event session is a social gathering that allows the plurality of user accounts to freely enter an event, exit an event, and transfer between events. A user account can choose to join a public event session as each user account is prompted to enter the public event session with the corresponding user PC device, if the event session is designated as the public event session by the host account. In order for a user account to be admitted to a public event session, a plurality of specific accounts is designated as the plurality of attendee accounts with the remote server, if the public event session is selected to be entered by each specific account, and wherein each specific account is from the plurality of user accounts.

Figure 6:
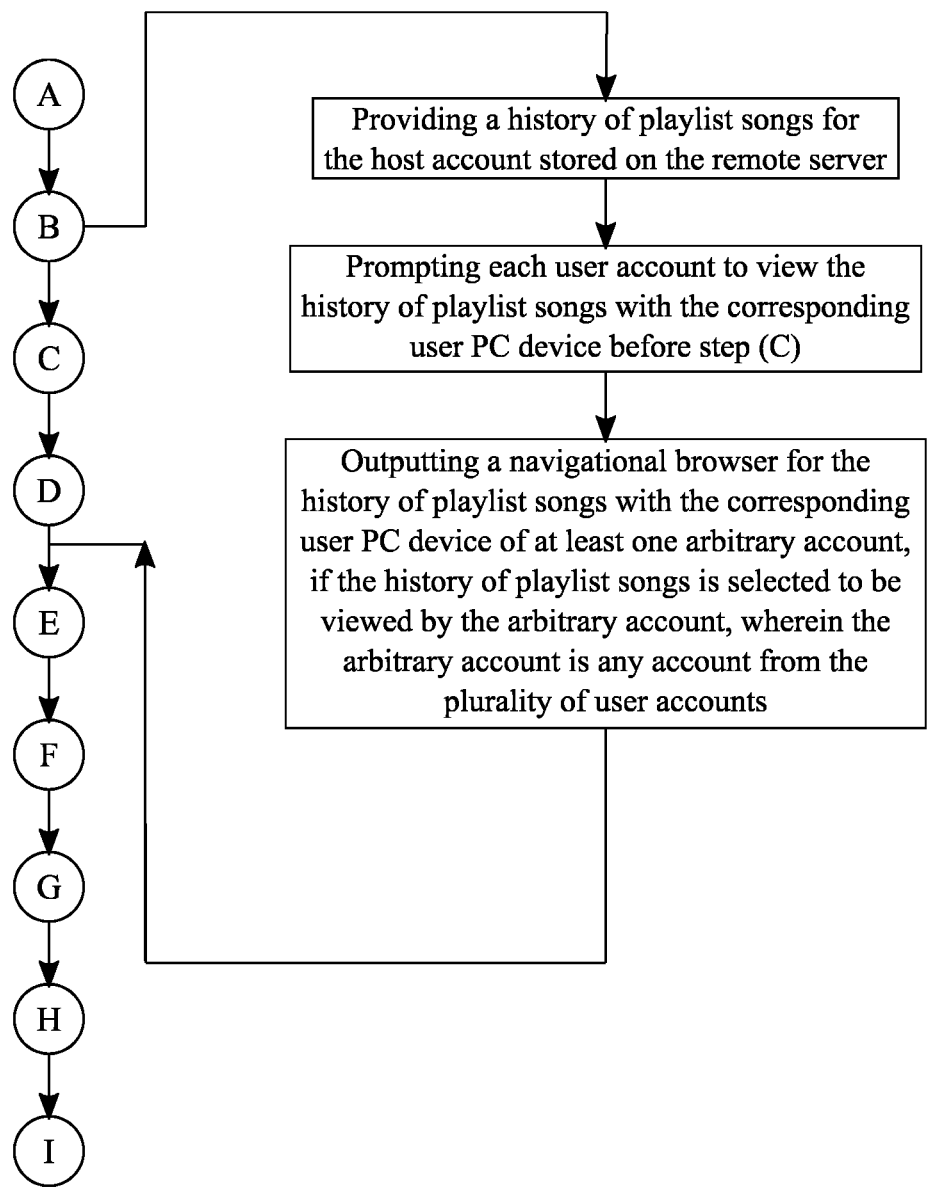
FIG. 6 is a flowchart illustrating a subprocess for outputting the navigational browser for a history of playlist songs.

The user account is further able to select an event session based on personal music preference as a history of playlist songs for the host account is provided and stored on the remote server, seen in FIG. 6. The history of playlist songs is a list of songs that were previously played at an event session or multiple event sessions by a given host account. Each song entry from the history of playlist songs provides general information on a previously-played song such as a title, a genre, a set of corresponding event session information. In order for the user account to review the history of playlist songs, each user account is prompted to view the history of playlist songs with the corresponding user PC device before Step C. A navigational browser is outputted for the history of playlist songs with the corresponding user PC device of at least one arbitrary account, if the history of playlist songs is selected to be viewed by the arbitrary account, wherein the arbitrary account is any account from the plurality of user accounts. The navigational browser allows the user account to scroll and browse through the history of playlist songs. The navigational browser preferably allows the user account to select, play, like, and save a song entry from the history of playlist songs as well.

Figure 7:
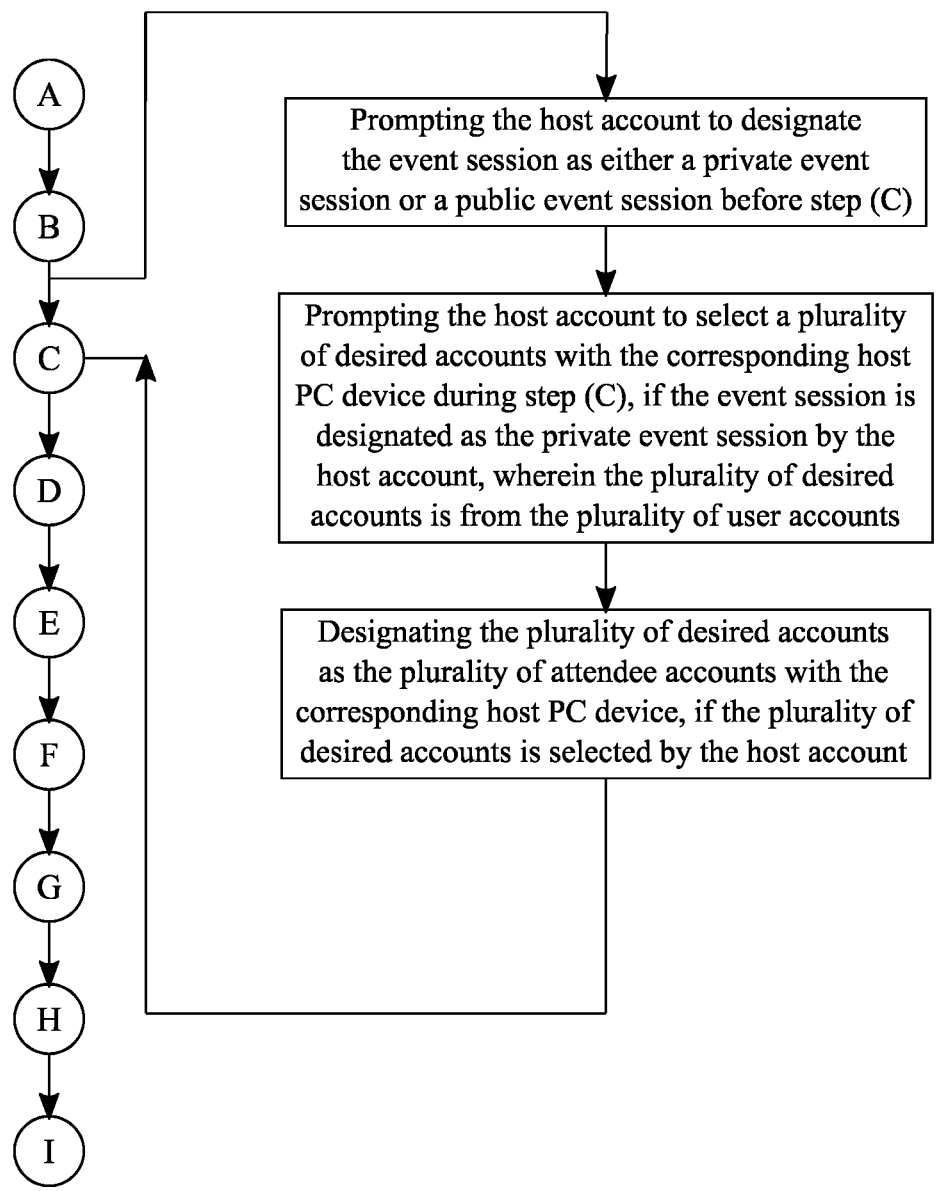
FIG. 7 is a flowchart illustrating a subprocess for allowing a host account to invite desired user accounts as attendee accounts.

In order to accommodate a social gathering for a select few, the host account can again be prompted to designate the event session as either a private event session or a public event session before Step C, seen in FIG. 7. Access is limited to the event session by prompting the host account to select a plurality of desired accounts with the corresponding host PC device during Step C, if the event session is designated as the private event session by the host account, wherein the plurality of desired accounts is from the plurality of user accounts. The plurality of desired accounts is the select few the host account permits to join or expects to join the event session. The plurality of desired accounts may be searched by a username in a search bar or already designated as followers or friends of the host account. The plurality of desired accounts is designated as the plurality of attendee accounts with the corresponding host PC device, if the plurality of desired accounts is selected by the host account. Therefore, each desired account should also accept or acknowledge attendance to the event session.

Figure 8:
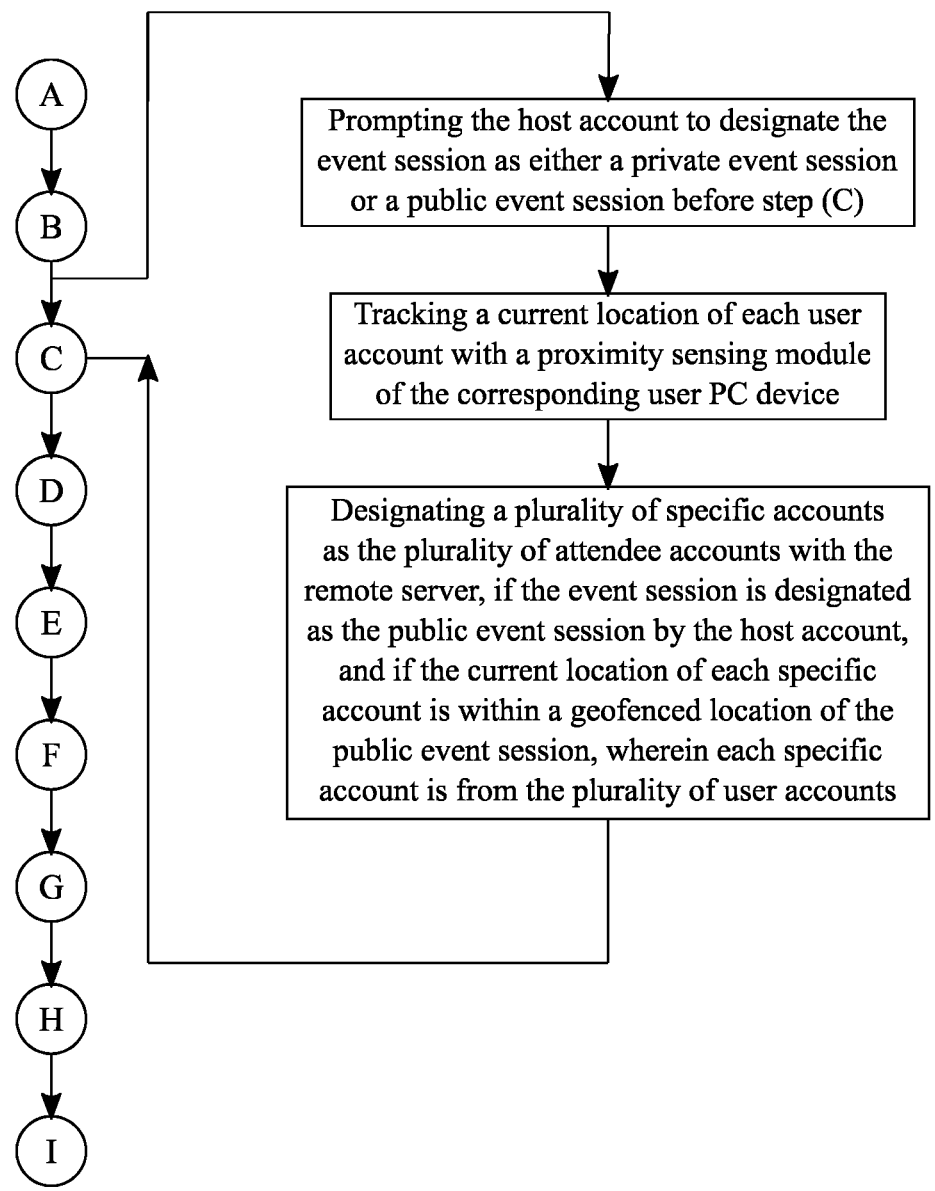
FIG. 8 is a flowchart illustrating a subprocess for allowing user accounts to physically join an event session as attendee accounts.

For a public event session at a physical venue, the attendance of the plurality of user accounts is not accounted for prior to the event session like that of a private event session. In order to determine if a user account is an attendee account, the host account can review the comings and goings of the plurality of attendee accounts. The host account first is prompted to designate the event session as either a private event session or a public event session before Step C, seen in FIG. 8. Furthermore, a current location of each user account is tracked with a proximity sensing module of the corresponding user PC device. The current location is the live positioning of the user account with the corresponding user PC device with respect to the host account with the corresponding host PC device. The proximity sensing module of the user PC device senses the current location of the user account while within a vicinity of the host account. The proximity sensing module may be, but is not limited to, a module communication with a global positioning system (GPS), a module communicating with a personal area network (e.g. Bluetooth), and a module communicating with a local area network (e.g. Wi-Fi) If the plurality of user accounts is within a given vicinity of the host account, a plurality of specific accounts is designated as the plurality of attendee accounts with the remote server, if the event session is designated as the public event session by the host account, and if the current location of each specific account is within a geofenced location of the public event session, wherein each specific account is from the plurality of user accounts. More specifically, the geofenced location is the given vicinity specified by the host account, thereby defining the plurality of specific accounts as the plurality of attendee accounts. The host account is able to see the traffic of user accounts throughout the duration of the public event session and adjust the plurality of playlist songs, accordingly.

Figure 9:
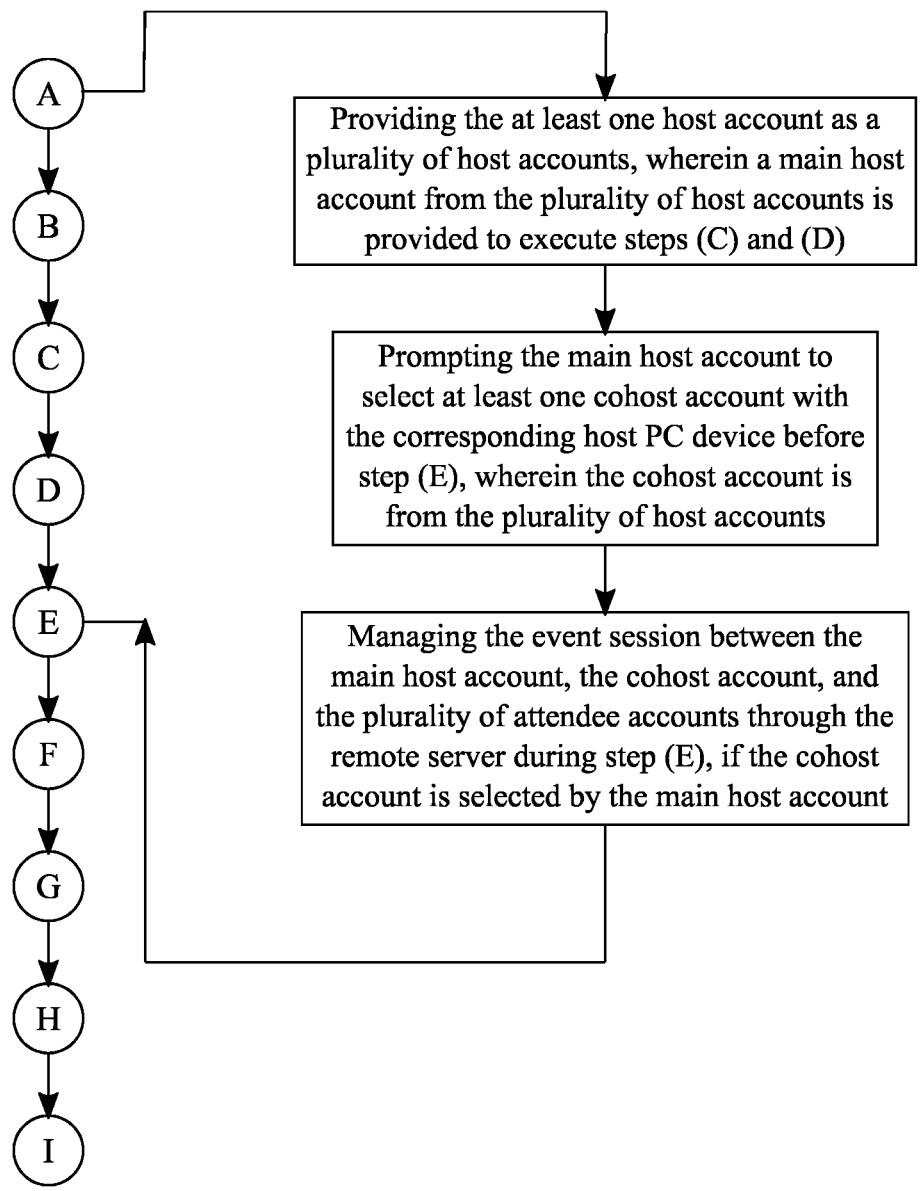
FIG. 9 is a flowchart illustrating a subprocess for allowing multiple host accounts to manage the event session.

Regardless if the event session is a private event session or a public event session, multiple host accounts are permissible at the event session as the at least one host account is provided as a plurality of host accounts, wherein a main host account from the plurality of host accounts is provided to execute Step C and Step D, seen in FIG. 9. The event session is primarily managed by the main host account, but other host accounts can assist in the management of the event session. In order to grant other host accounts access to the plurality of host accounts, the main host account is prompted to select at least one cohost account with the corresponding host PC device before Step E, wherein the cohost account is from the plurality of host accounts. The cohost account is a specific host account that is granted permission to also manage the plurality of playlist songs. Thus, the event session is managed between the main host account, the cohost account, and the plurality of attendee accounts through the remote server during Step E, if the cohost account is selected by the main host. Moreover, the main host account and the cohost account may independently edit the plurality of playlist songs while taking into account the feedback of the plurality of attendee accounts.

Figure 10:
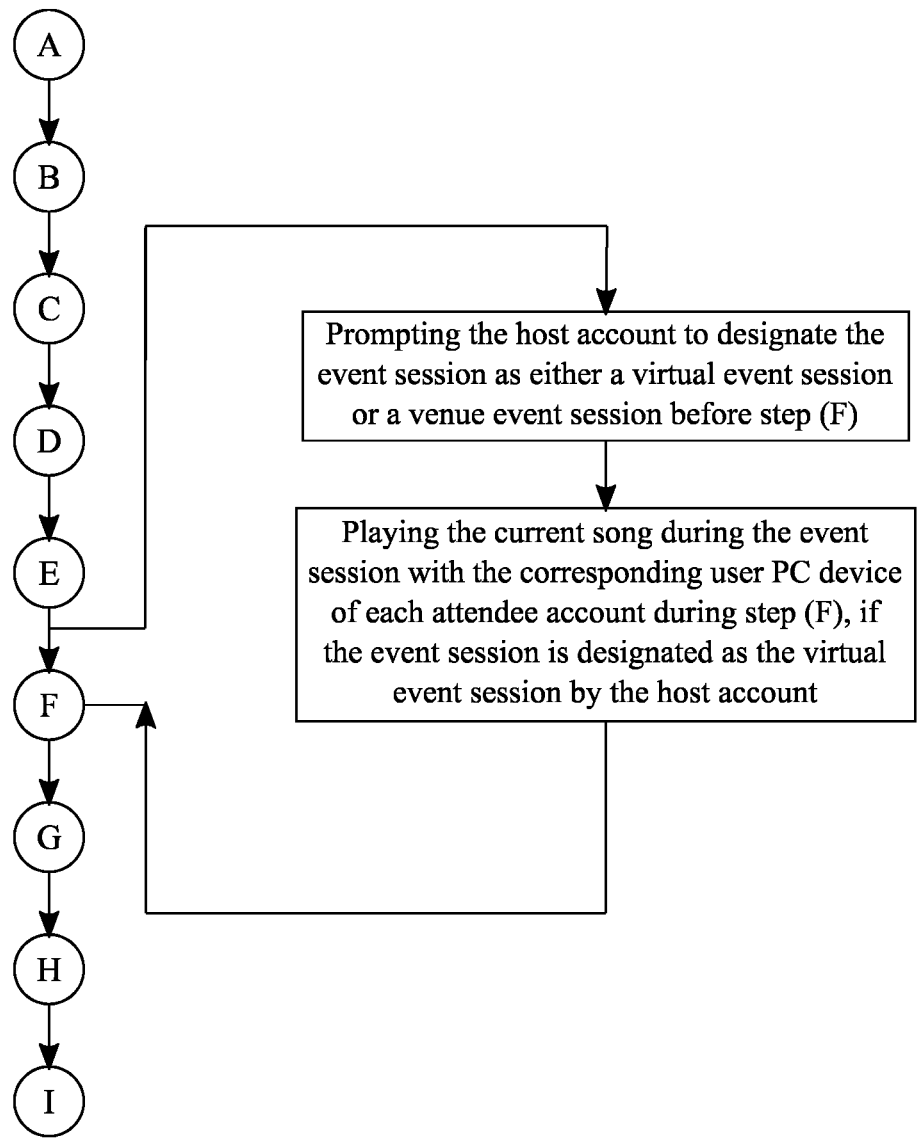
FIG. 10 is a flowchart illustrating a subprocess for playing the current song through a user PC device of each attendee account during a private event session.

Again, regardless if the event session is a private event session and a public event session, the event session may be remotely attended by the plurality of user accounts. In order to differentiate the event session between remote attendance and in-person attendance, the host account is prompted to designate the event session as either a virtual event session or a venue event session before Step F, seen in FIG. 10. The virtual event session allows the host account to remotely perform at the event session and allows the plurality of user accounts to remotely attend the event session. The virtual event session designates the event session as in-person attendance and requires the plurality of user accounts to be within the geofenced area with the corresponding user PC devices. The current song is played during the event session with the corresponding user PC device of each attendee account during Step F, if the event session is designated as the virtual event session by the host account. Each attendee account is therefore able to remotely view and virtually engage with the host account through the corresponding user PC device.

Figure 11:
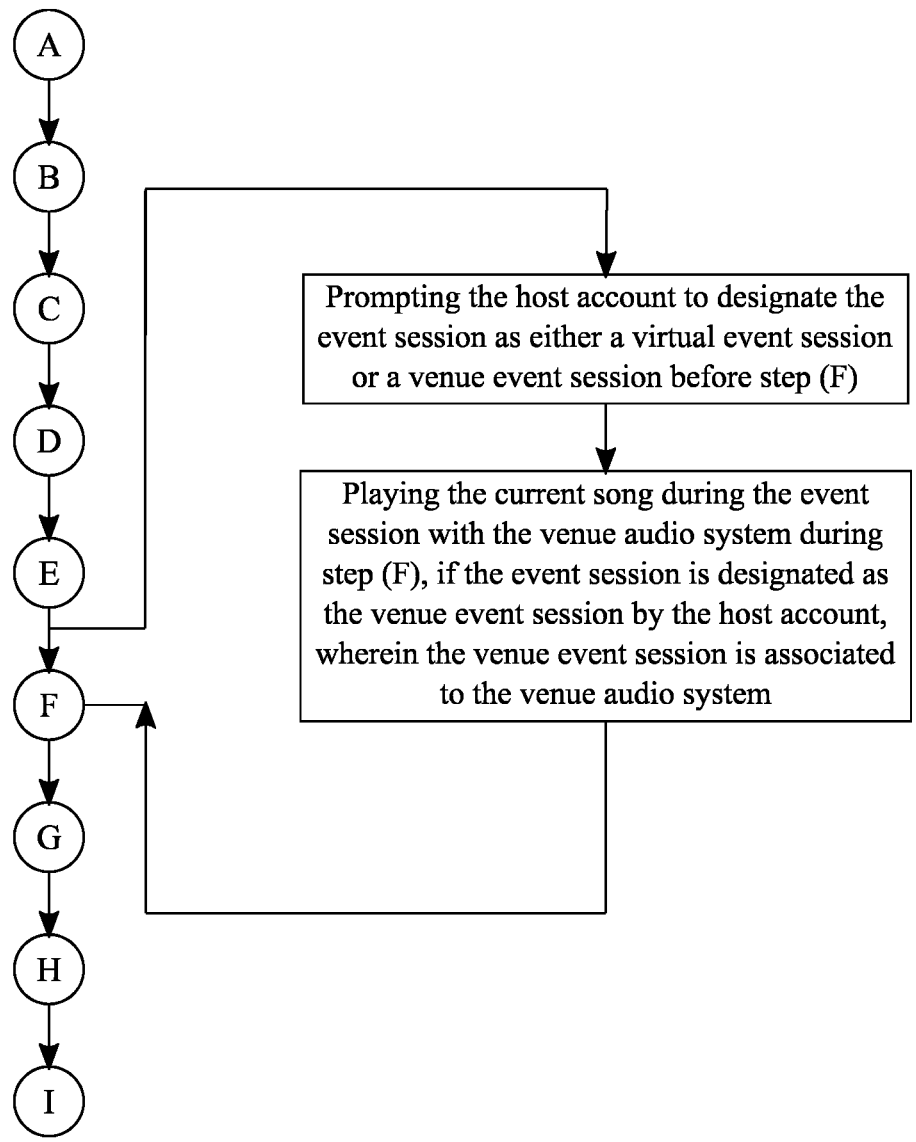
FIG. 11 is a flowchart illustrating a subprocess for playing the current song through a venue audio system during a venue event session.

Similarly, for in-person attendance of the event session, the host account is prompted to designate the event session as either a virtual event session or a venue event session before Step F, seen in FIG. 11. The plurality of attendee accounts experiences the event session in a live setting as the current song is played during the event session with the venue audio system during Step F, if the event session is designated as the venue event session by the host account, wherein the venue event is associated to the venue audio system.

Figure 12:
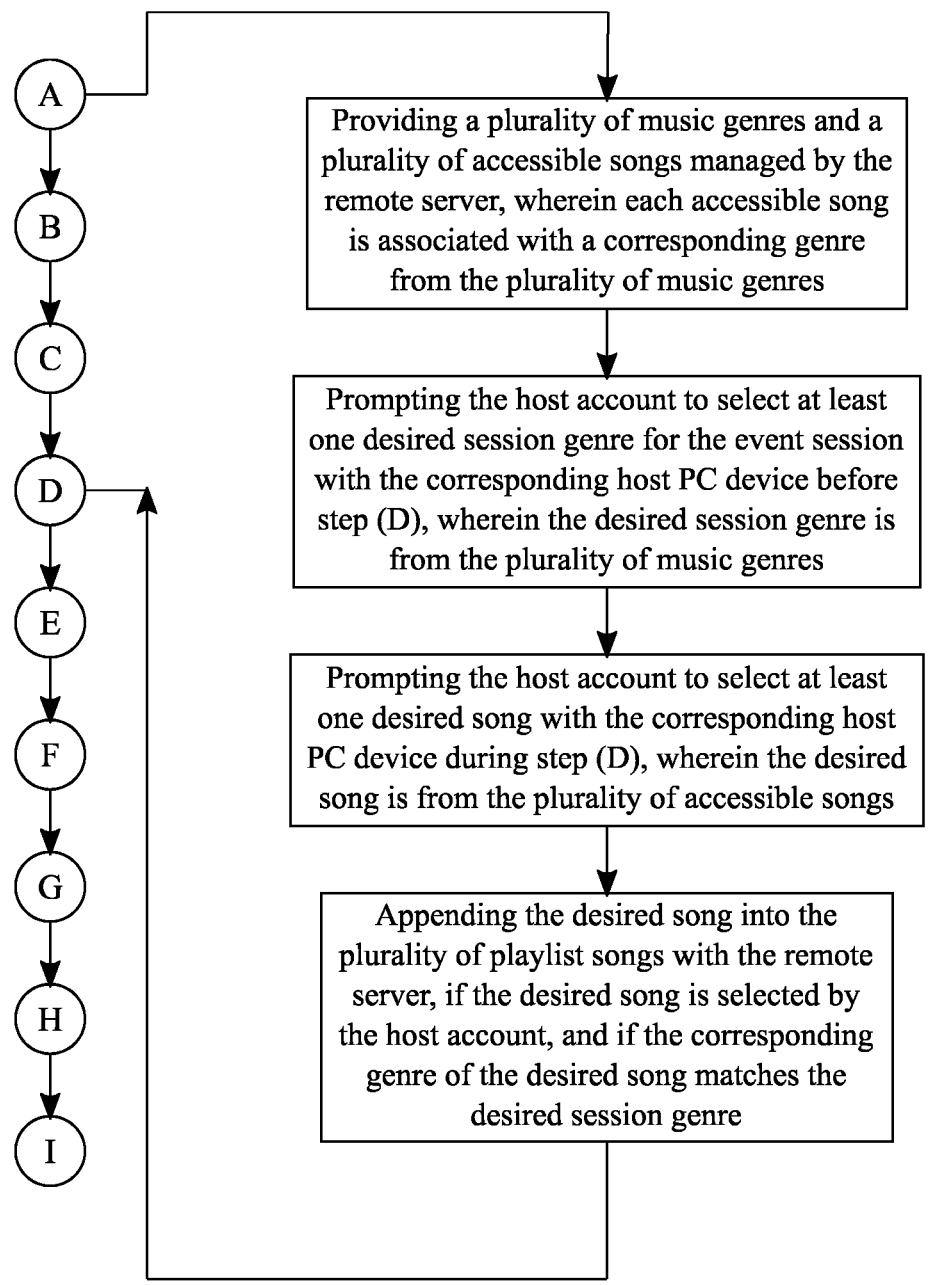
FIG. 12 is a flowchart illustrating a subprocess for appending a specific song based on a desired music genre into the plurality of playlist songs.

In order to provide a continuously appealing plurality of playlist songs throughout the duration of all types of event sessions, a plurality of music genres and a plurality of accessible songs are provided and managed by the remote server, wherein each accessible song is associated with a corresponding genre from the plurality of music genres, seen in FIG. 12. The plurality of music genres associates each playlist song with a type of music. The plurality of accessible songs is the plurality of playlist songs with the same music genre. The music genre of an event session is defined as the host account is prompted to select at least one desired session genre for the event session with the corresponding host PC device before Step D, wherein the desired session genre is from the plurality of music genres. The host account is prompted to select at least one desired song with the corresponding host PC device during Step D, wherein the desired song is from the plurality of accessible songs, thereby providing consistency in music selection throughout the duration of the event session. The plurality of playlist songs is generated with a consistent music genre as the desired song is appended into the plurality of playlist songs with the remote server, if the desired song is selected by the host account, and if the corresponding genre of the desired song matches the desired session genre.

Figure 13:
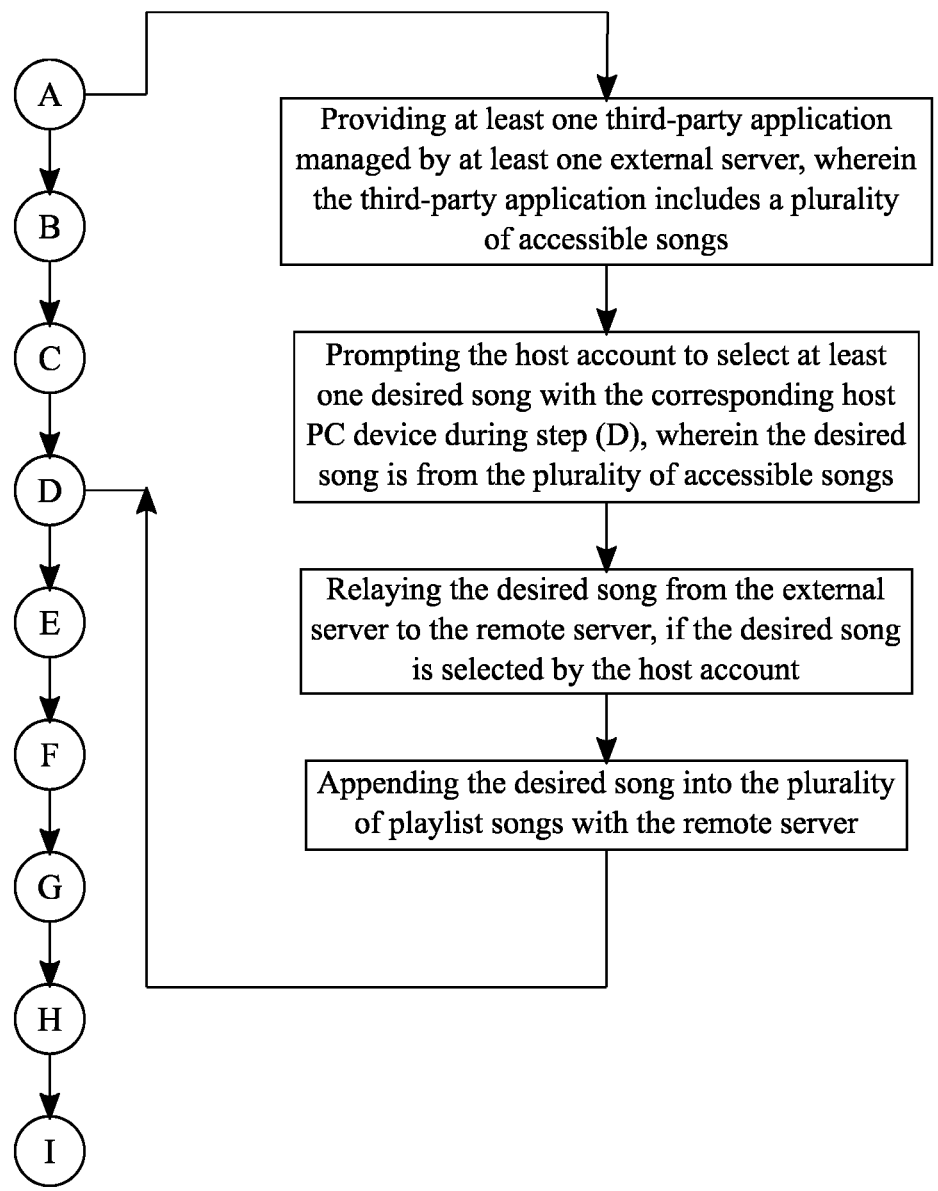
FIG. 13 is a flowchart illustrating a subprocess for appending a desired song stored on a third-party application into the plurality of playlist songs.

In order to facilitate the generation of the plurality of playlist songs, at least one third-party application is provided and managed by at least one external server, wherein the third-party application includes a plurality of accessible songs, seen in FIG. 13. The at least one third-party application is another music player application that may have an existing set of downloaded or liked songs. The plurality of accessible songs is a set of songs that are available to the host account through the third-party application and can be synchronized with the plurality of playlist songs of the present invention. In order to add a specific accessible song from the at least one third-party application, the host account is prompted to select at least one desired song with the corresponding host PC device during Step D, wherein the desired song is from the plurality of accessible songs. The desired song is then relayed from the external server to the remote server, if the desired song is selected by the host account. The desired song is appended into the plurality of playlist songs with the remote server, successfully contributing to the plurality of playlist songs via the at least one third-party application.

Figure 14:
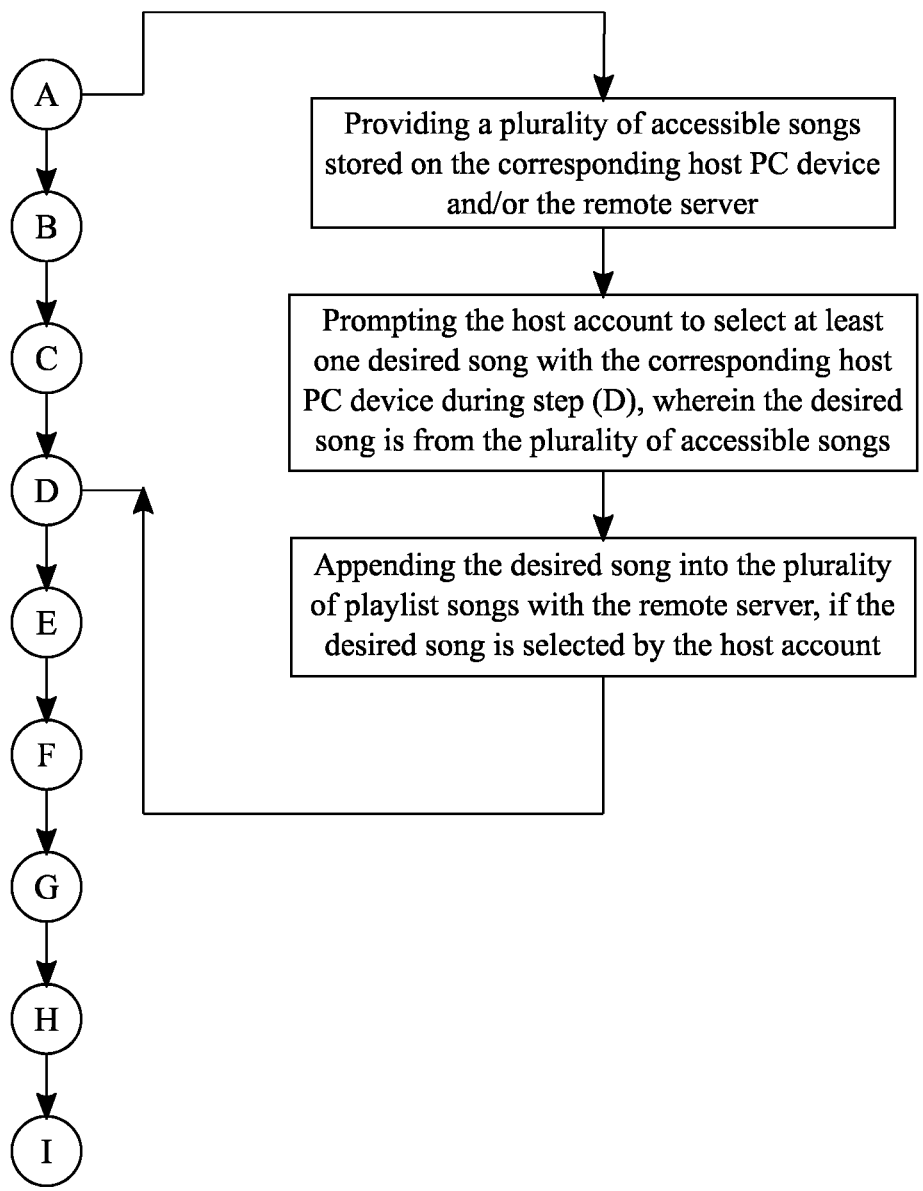
FIG. 14 is a flowchart illustrating a subprocess for appending a desired song stored on a host PC device or the remote server into the plurality of playlist songs.

In order to directly contribute to the plurality of playlist songs with the present invention, a plurality of accessible songs is provided and stored on the corresponding host PC device and/or the remote server, seen in FIG. 14. The plurality of accessible songs is a set of songs that are available to the host account on the corresponding host PC device and/or the remote server and can be added to the plurality of playlist songs of the present invention. In order to add a specific accessible song to the plurality of playlist songs, the host account is prompted to select at least one desired song with the corresponding host PC device during Step D, wherein the desired song is from the plurality of accessible songs. The desired song is then appended into the plurality of playlist songs with the remote server, if the desired song is selected by the host account, successfully contributing to the plurality of playlist songs via the corresponding host account PC device and/or the remote server.

Figure 15:
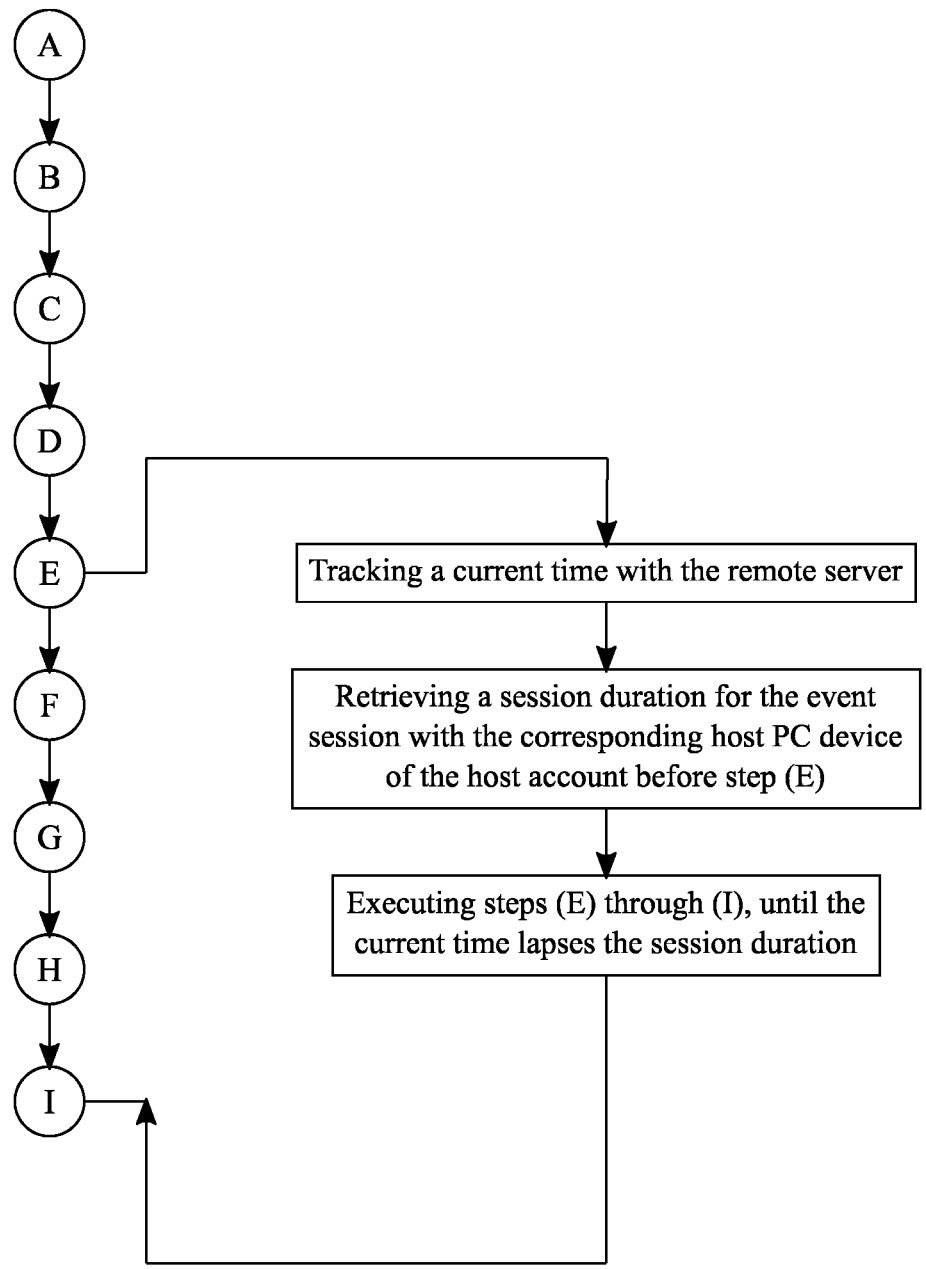
FIG. 15 is a flowchart illustrating a subprocess for executing the event session until the current time lapses a session duration.

Not only is the music genre consistent throughout the duration of the event session, the plurality of playlist songs is also continuously played throughout the duration of the event session in order to maintain the atmosphere of the event session. In order to ensure the plurality of playlist songs endure the duration of the event session, a current time is tracked with the remote server, seen in FIG. 15. Moreover, a session duration is retrieved for the event session with the corresponding host PC device of the host account before Step E. The session duration is the total time of the event session with a given start and a given stop time. The plurality of playlist songs is played and the plurality of user accounts may provide feedback for the host account throughout the duration of the event session as the Step E through Step I are executed, until the current time lapses the session duration.

Figure 16:
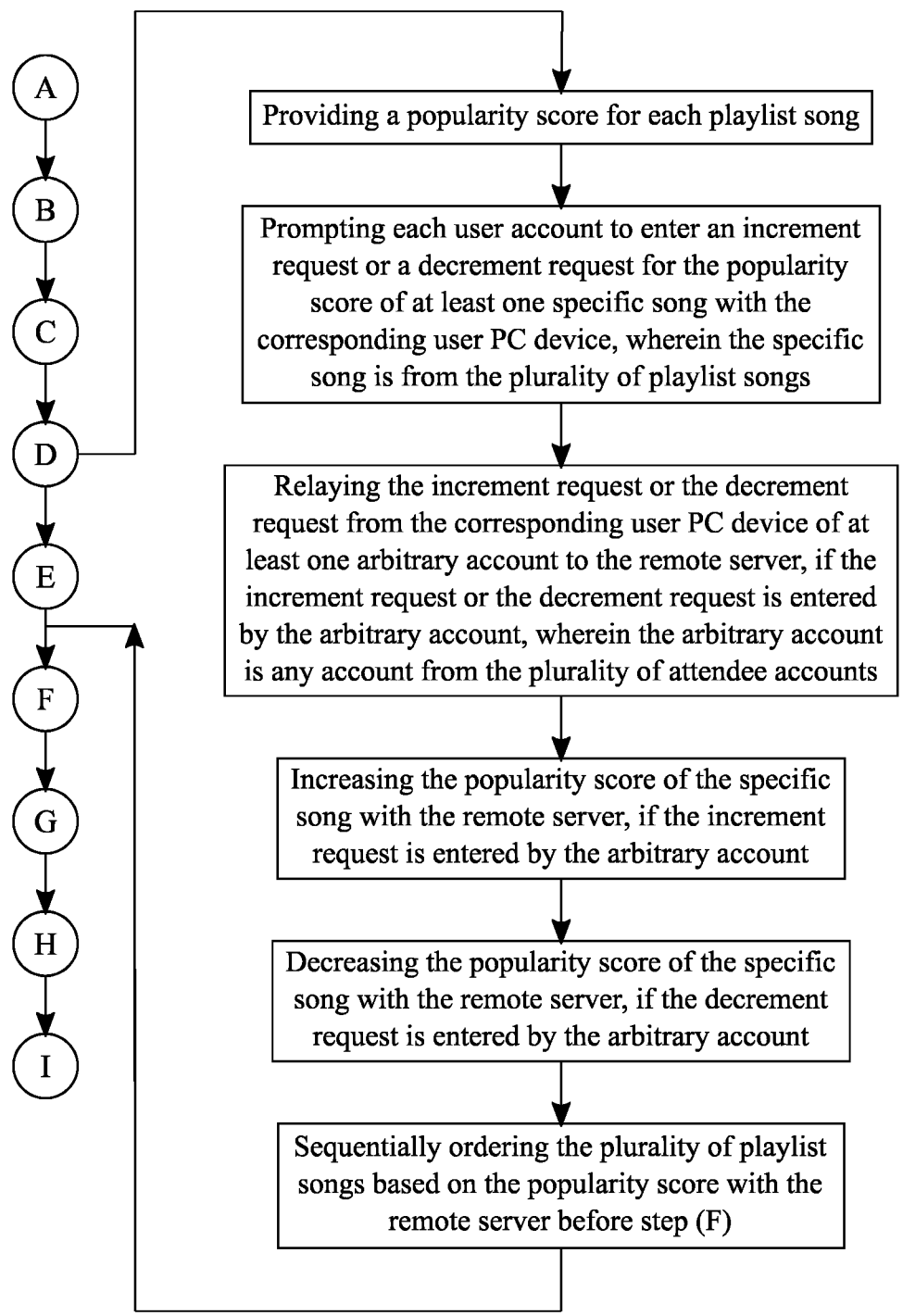
FIG. 16 is a flowchart illustrating a subprocess for sequentially ordering the plurality of playlist songs based on a popularity score.

In order to facilitate the management of the plurality of playlist songs for the host account, a popularity score is provided for each playlist song, seen in FIG. 16. The popularity score is a tallied value of likes and dislikes of the plurality of user accounts that determines if a given playlist song is well liked or very much disliked by the plurality of user accounts. In order to tally the likes and dislikes of each user account, each user account is prompted to enter an increment request or a decrement request for the popularity score of at least one specific song with the corresponding user PC device, wherein the specific song is from the plurality of playlist songs. The user account willingly chooses to express the liking of the specific song with the increment request or to express the disliking of the specific song with the decrement request. The increment request and the decrement request is communicated to the remote server as the increment request or the decrement request is relayed from the corresponding user PC device of at least one arbitrary account to the remote server, if the increment request or the decrement request is entered by the arbitrary account, wherein the arbitrary account is any account from the plurality of attendee accounts. The popularity score reflects the overall appeal of the specific song as the popularity score of the specific song is increased with the remote server, if the increment request is entered by the arbitrary account. Likewise, the popularity score reflects the overall disdain of the specific song as the popularity score of the specific song is decreased with the remote server, if the decrement request is entered by the arbitrary account. The plurality of playlist songs is sequentially ordered based on the popularity score with the remote server before Step F, thereby automatically adjusting the plurality of playlist songs for the host account, and facilitating the management of the plurality of playlist songs for a satisfying performance.

Figure 17:
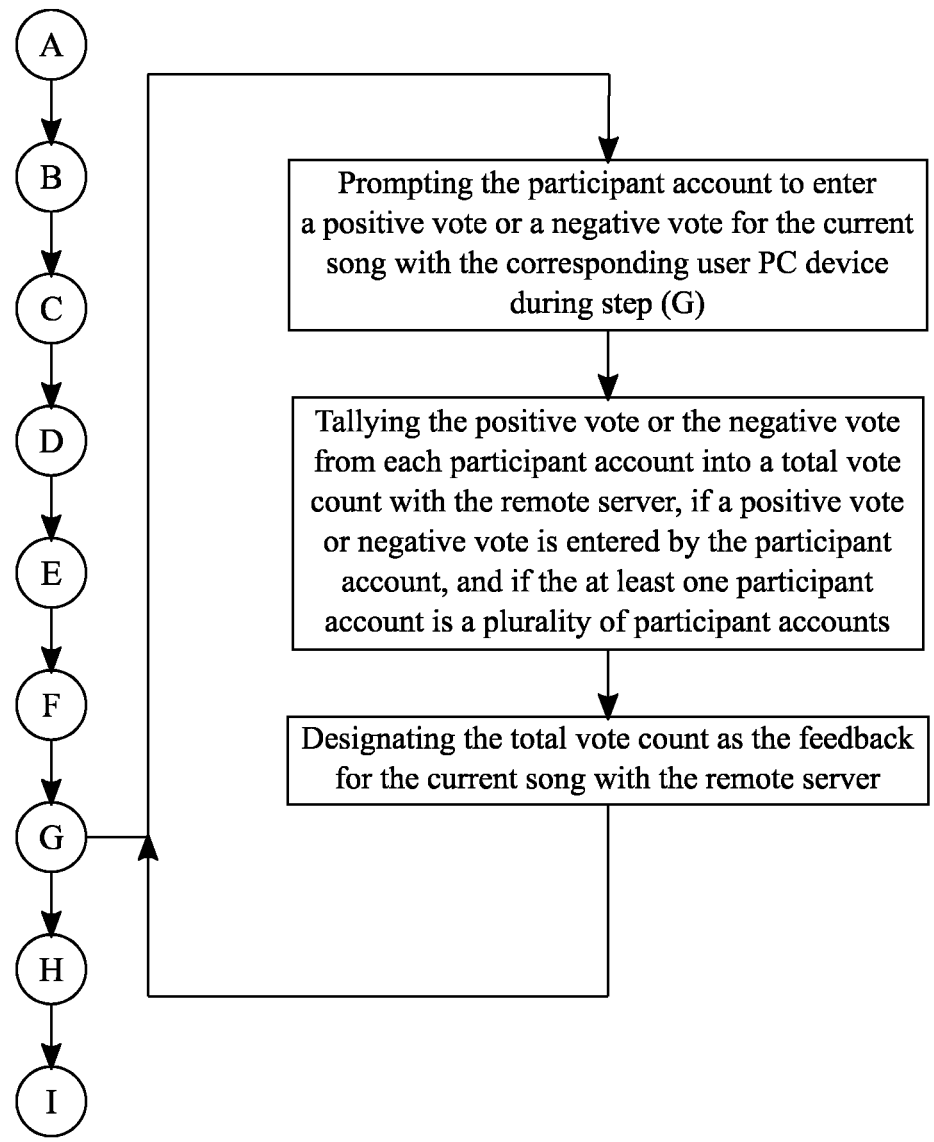
FIG. 17 is a flowchart illustrating a subprocess for providing feedback for the current song by tallying a total vote count from the attendee accounts.

The host account is better able to manage the plurality of playlist songs and provide a better experience for the plurality of participant accounts as the participant account is prompted to enter a positive vote or a negative vote for the current song with the corresponding user PC device during Step G, seen in FIG. 17. The positive vote or the negative vote is tallied from each participant account into a total vote count with the remote server, if a positive vote or negative vote is entered by the participant account, and if the at least one participant account is a plurality of participant accounts. Each participant account may therefore provide live feedback during the event session and allow the host to better accommodate for the preference of the plurality of participant accounts. The total vote count is designated as the feedback for the current song with the remote server, and more specifically, the feedback may be categorized as active feedback.

Figure 18:
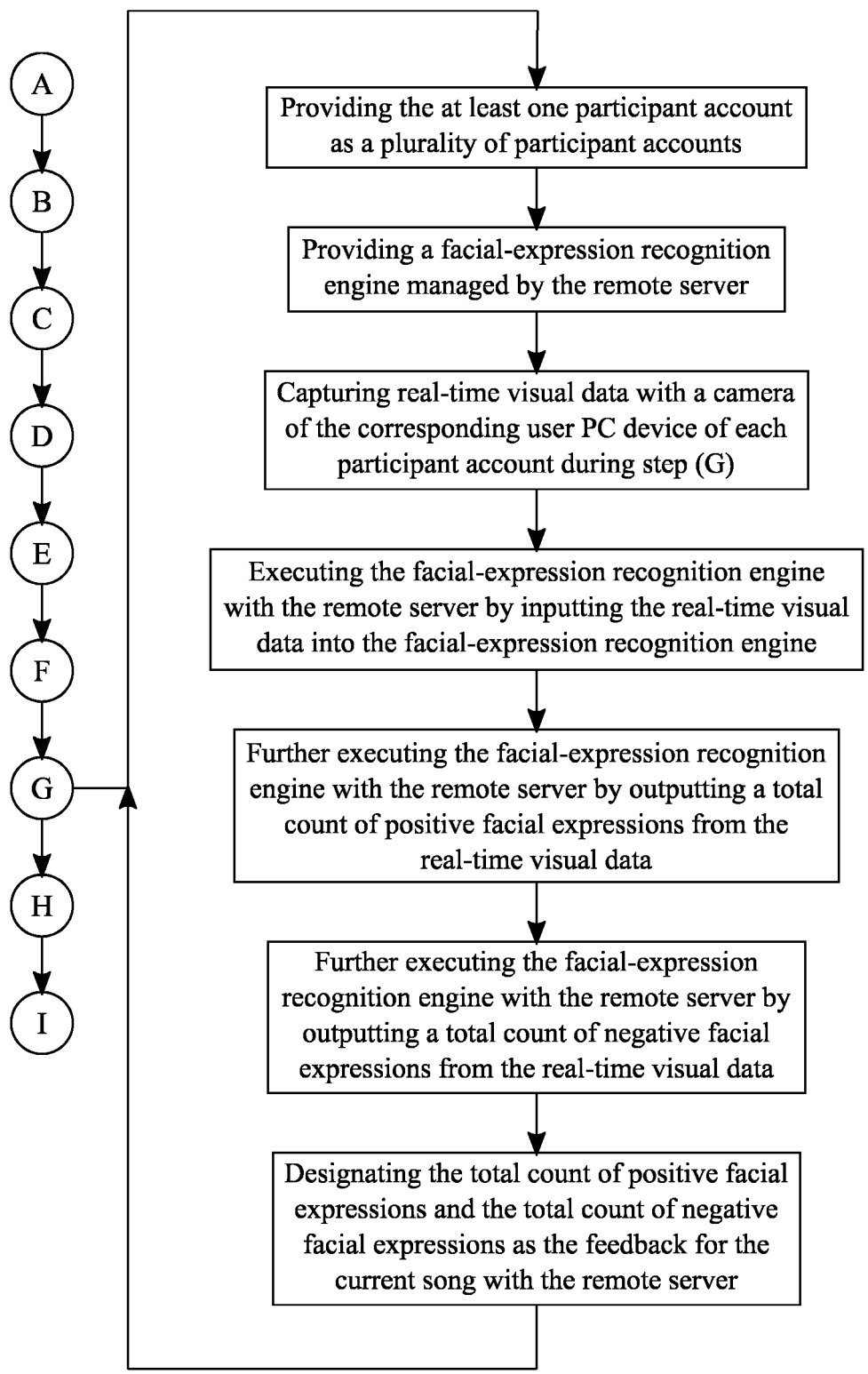
FIG. 18 is a flowchart illustrating a subprocess providing feedback for the current song by tallying a total count of positive facial expressions and of negative facial expressions from attendee accounts.

The plurality of user accounts may further inform the host account of personal preferences for the plurality of playlist songs with passive feedback. In accommodate the passive feedback of each participant account, the at least one participant account is provided as a plurality of participant accounts, seen in FIG. 18. Furthermore, a facial-expression recognition engine is provided and managed by the remote server. The facial-expression recognition engine visually detects the visible facial expressions of each participant account and determines if the facial expression is positive or negative. Real-time visual data is captured with a camera of the corresponding user PC device of each participant account during Step G. The real-time visual data registers the visible facial expression of each participant account with the camera. In order to determine the impression of the current song with each visible face with a corresponding camera, the facial-expression recognition engine is executed with the remote server by inputting the real-time visual data into the facial-expression recognition engine. An overall impression of the current song is characterized by the live facial expressions from the plurality of participant accounts as the facial-expression recognition engine is further executed with the remote server by outputting a total count of positive facial expressions from the real-time visual data. The total count of positive facial expressions is a tally of positive facial expressions that reflect happiness or excitement. Likewise, the facial-expression recognition engine is further executed with the remote server by outputting a total count of negative facial expressions from the real-time visual data. The total count of negative facial expression is a tally of negative facial expressions that reflect annoyance or boredom. The total count of positive facial expressions and the total count of negative facial expressions are designated as the feedback for the current song with the remote server. The host account is therefore able to receive a better analysis of the current song without any active feedback from the plurality of participant accounts.

Figure 19:
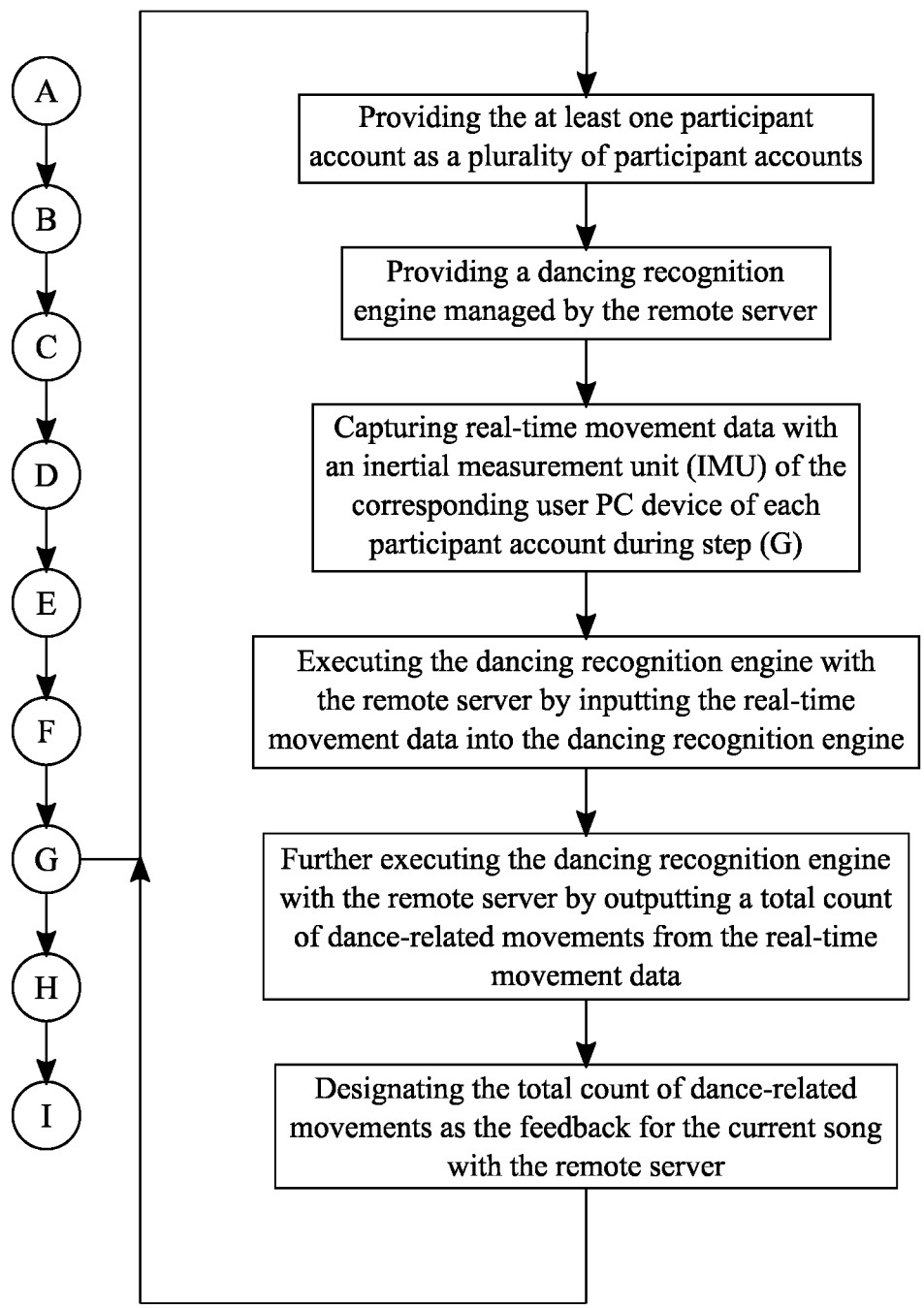
FIG. 19 is a flowchart illustrating a subprocess for providing feedback for the current song by tallying a total count of dance-related movements from attendee accounts.

As previously discussed, the at least one participant account is provided as a plurality of participant accounts, seen in FIG. 19. In addition to retrieving passive feedback through visual input, passive feedback is also retrieved through motion or movement input as a dancing recognition engine is provided and managed by the remote server. The dancing recognition engine process data from any type of dancing or movements and determines if the dancing or movement is synchronized with the rhythmic portion of the current song. Real-time movement data is captured with an inertial measurement unit (IMU) of the corresponding user PC device of each participant account during Step G. Real-time movement data registers the dancing or movements of each participant account with the IMU. An overall impression of the current song is characterized by the live dancing or movement from the plurality of participant accounts as the dancing recognition engine is executed with the remote server by inputting the real-time movement data into the dancing recognition engine. The dancing recognition engine is further executed with the remote server by outputting a total count of dance-related movements from the real-time movement data. The total count of dance related movements accounts for any an all dancing or movements that mirror the rhythm of the current song. The total count of dance-related movement is designated as feedback for the current song with the remote server. The host account is therefore able to receive a better analysis of the current song without any active feedback from the plurality of participant accounts.

Figure 20:
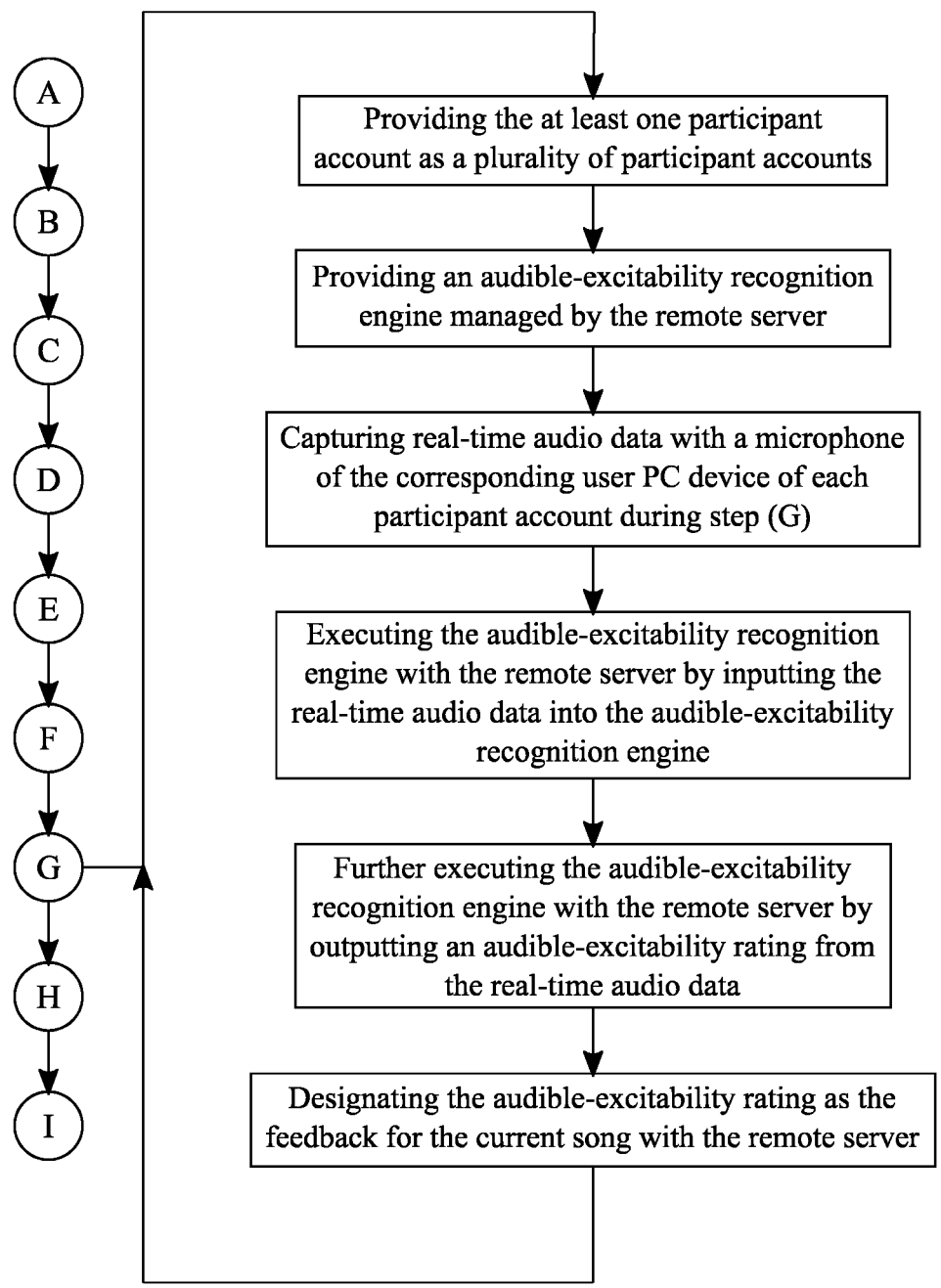
FIG. 20 is a flowchart illustrating a subprocess for providing feedback for the current song by assessing an audible-excitability rating form attendee accounts.

As previously discussed, the at least one participant account is provided as a plurality of participant accounts, seen in FIG. 20. In order to accommodate the passive feedback of each participant account, an audible-excitability recognition engine is provided and managed by the remote server. Furthermore, the audible-excitability recognition engine process data from the vocal expressions of each participant account and determines if the vocal expression is positive or negative. Real-time audio data is captured with a microphone of the corresponding user PC device of each participant account during Step G. The real-time audio data registers the vocal expression of each participant account with the microphone. An overall impression of the current song is characterized by the live vocal expressions from the plurality of participant accounts as the audible-excitability recognition engine is executed with the remote server by inputting the real-time audio data into the audible-excitability recognition engine. The audible-excitability recognition engine is further executed with the remote server by outputting an audible-excitability rating from the real-time audio data. The audible-excitability rating accounts for any and all vocal expressions such as cheers or boos. The audible-excitability rating is designated as feedback for the current song with the remote server. The host account is therefore able to receive a better analysis of the current song without any active feedback from the plurality of participant accounts.

Figure 21:
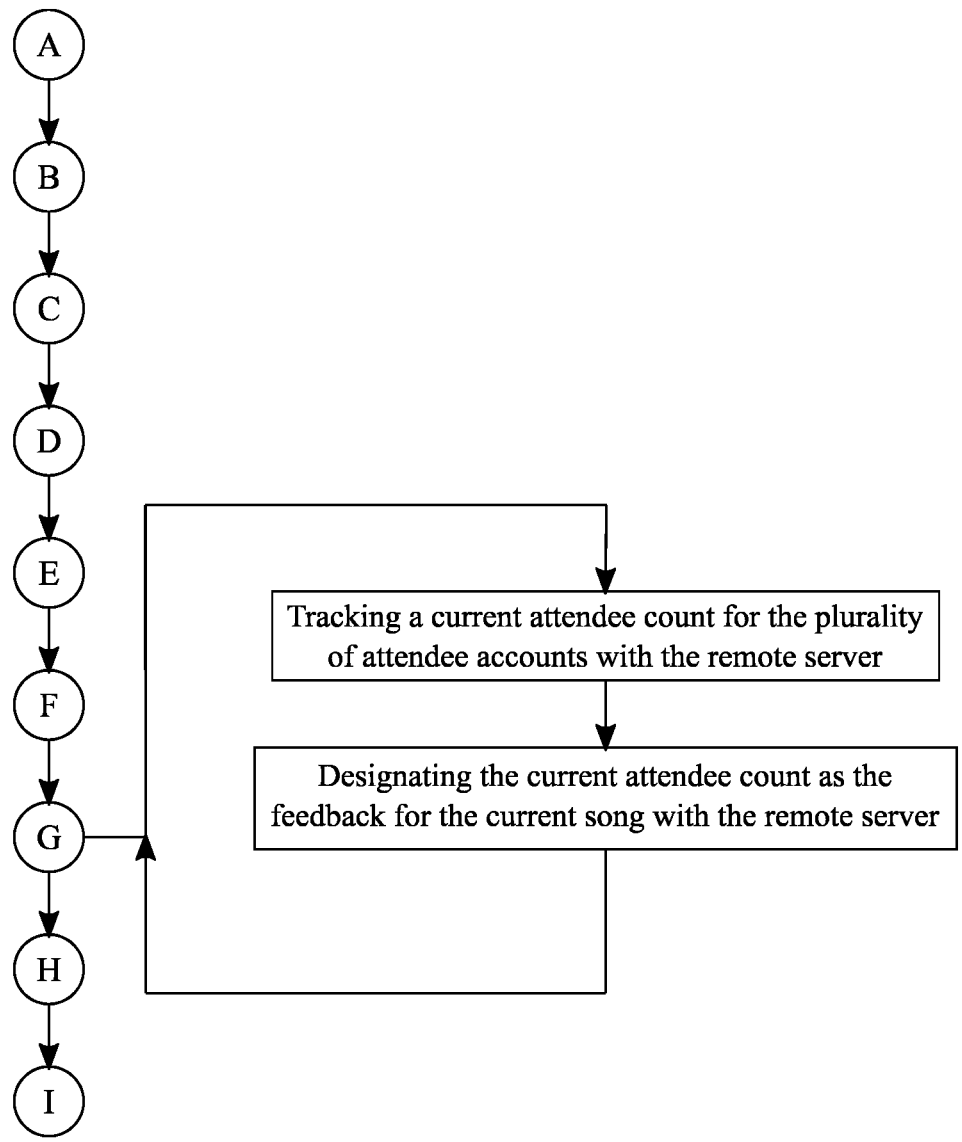
FIG. 21 is a flowchart illustrating a subprocess for providing feedback for the current song by assessing an audible-excitability rating from attendee accounts.

Additional passive feedback is provided as a current attendee count is tracked for the plurality of attendee accounts with the remote server, seen in FIG. 21. The current attendee count is the total number of users attending the event session. For a virtual event session, the current attendee count represents the attendee accounts that are registered or remotely logged in real-time. For a venue event session, the current attendee count represents the attendee accounts that are physically present within the geofenced area in real-time. The current attendee count is designating as the feedback for the current song with the remote server. The host account is therefore able to receive a better analysis of the current song without any active feedback from the plurality of participant accounts.

Figure 22:
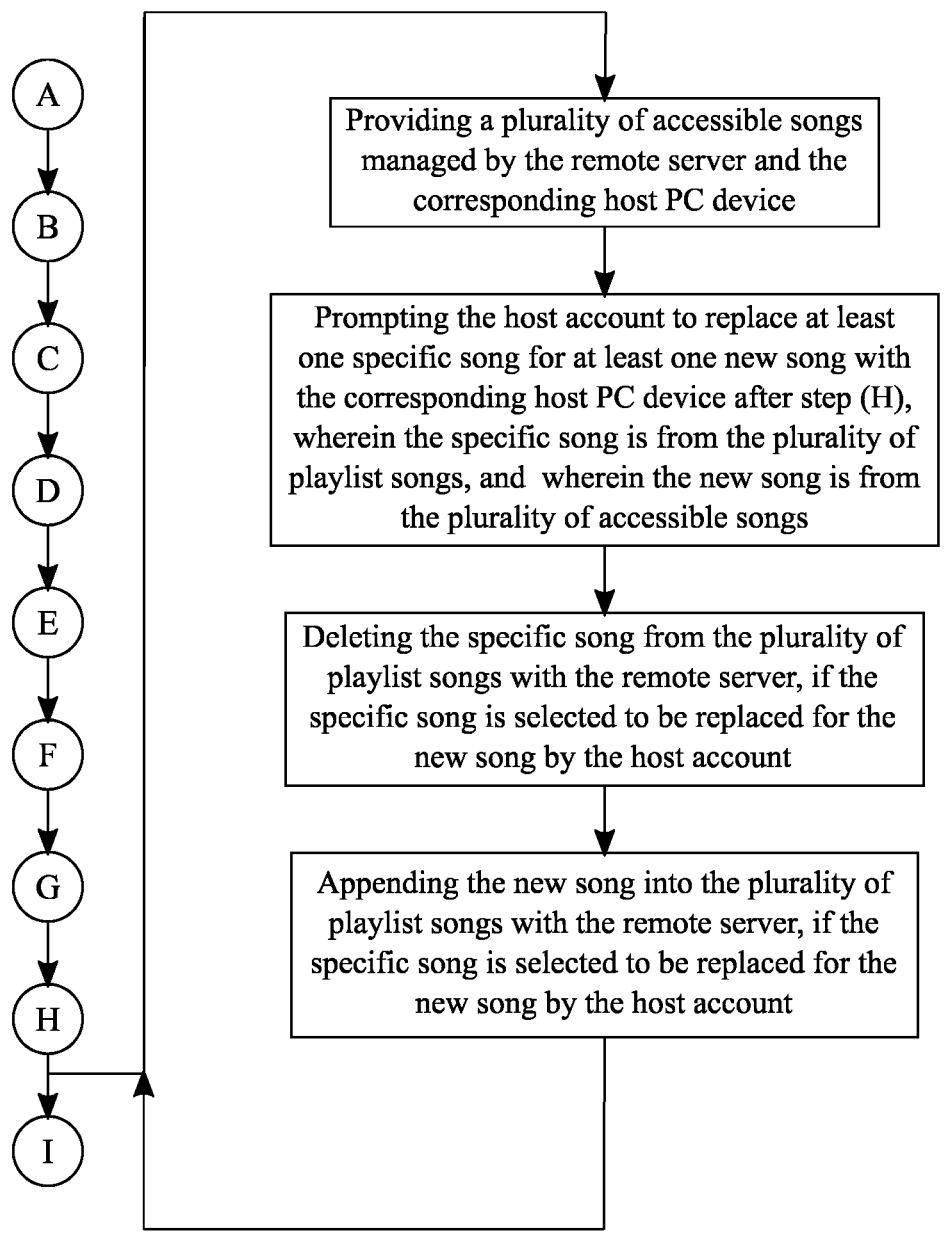
FIG. 22 is a flowchart illustrating a subprocess for allowing the host account to replace a specific song from the plurality of playlist songs with a new song.

In order to adjust the plurality of playlist songs after receiving both active feedback and passive feedback, a plurality of accessible songs is provided and managed by the remote server and the corresponding host PC device, seen in FIG. 22. The plurality of accessible songs is a set of songs in the same music genre that are available to the host account. It is understood that certain music genres may be related or mixed with one another. The host account is prompted to replace at least one specific song for at least one new song with the corresponding host PC device after Step H, wherein the specific song is from the plurality of playlist songs, and wherein the new song is from the plurality of accessible songs, thereby further providing a better experience for the plurality of attendee accounts. The specific song may no longer be played with the rest of the plurality of playlist songs as the specific song is deleted from the plurality of songs with the remote server, if the specific song is selected to be replaced for the new song by the host account. The new song is appended into the plurality of playlist songs with the remote server, if the specific song is selected to be replaced for the new song by the host account, thereby maintaining the continuous play the plurality of playlist songs throughout the duration of the event session. This allows the host account to readily update the plurality of playlist songs during the event session based on the active and/or passive feedback being received from the plurality of participant accounts.

Although the invention has been explained in relation to its preferred embodiment, it is to be understood that many other possible modifications and variations can be made without departing from the spirit and scope of the invention as hereinafter claimed.

What is claimed is:

1. A method of managing user engagement with a musical playlist, the method comprises the steps of:
   (A) providing a plurality of user accounts managed at least one remote server, wherein each user account is associated a corresponding user personal computing (PC) device;
   (B) providing at least one host account managed by the remote server, wherein the host account is associated with a corresponding host PC device;
   (C) prompting the host account to initiate an event session for a plurality of attendee accounts with the corresponding host PC device, wherein the plurality of attendee accounts is from the plurality of user accounts;
   (D) prompting the host account to designate a plurality of playlist songs with the corresponding host PC device, if the event session is initiated by the host account;
   (E) managing the event session between the host account and the plurality of attendee accounts through the remote server, if the plurality of playlist songs is designated by the host account;
   (F) playing a current song during the event session with the corresponding user PC device of each attendee account or with a venue audio system, wherein the current song is from the plurality of playlist songs, and wherein the venue audio system is associated with the event session;
   (G) relaying feedback for the current song with the corresponding user PC device of at least one participant account, through the remote server, and to the corresponding host PC device, wherein the participant account is from the plurality of attendee accounts;
   (H) outputting the feedback of the current song with the corresponding host PC device; and,
   (I) executing a plurality of iterations of steps (F) and (H), wherein the current song from each iteration is a different song from the plurality of playlist songs.

2. The method of managing user engagement with a musical playlist, the method as claimed in claim 1 comprises the steps of:
   providing the at least one host account as a plurality of host accounts, wherein each host account is associated at least one scheduled session, and wherein the scheduled session includes a date-and-time and a venue description;
   prompting each user account to view the scheduled session of each host account with the corresponding user PC device before step (C); and,
   outputting a navigational browser for the scheduled session of each host account with the corresponding user PC device of at least one arbitrary account, if the scheduled session of each host account is selected to be viewed by the arbitrary account, wherein the arbitrary account is any account from the plurality of user accounts.

3. The method of managing user engagement with a musical playlist, the method as claimed in claim 1 comprises the steps of:
   prompting the host account to designate the event session as either a private event session or a public event session before step (C);
   prompting each user account to enter the public event session with the corresponding user PC device, if the event session is designated as the public event session by the host account; and,
   designating a plurality of specific accounts as the plurality of attendee accounts with the remote server, if the public event session is selected to be entered by each specific account, and wherein each specific account is from the plurality of user accounts.

4. The method of managing user engagement with a musical playlist, the method as claimed in claim 1 comprises the steps of:
   providing a history of playlist songs for the host account stored on the remote server;
   prompting each user account to view the history of playlist songs with the corresponding user PC device before step (C); and,
   outputting a navigational browser for the history of playlist songs with the corresponding user PC device of at least one arbitrary account, if the history of playlist songs is selected to be viewed by the arbitrary account, wherein the arbitrary account is any account from the plurality of user accounts.

5. The method of managing user engagement with a musical playlist, the method as claimed in claim 1 comprises the steps of:
   prompting the host account to designate the event session as either a private event session or a public event session before step (C);
   prompting the host account to select a plurality of desired accounts with the corresponding host PC device during step (C), if the event session is designated as the private event session by the host account, wherein the plurality of desired accounts is from the plurality of user accounts; and,
   designating the plurality of desired accounts as the plurality of attendee accounts with the corresponding host PC device, if the plurality of desired accounts is selected by the host account.

6. The method of managing user engagement with a musical playlist, the method as claimed in claim 1 comprises the steps of:
   prompting the host account to designate the event session as either a private event session or a public event session before step (C);
   tracking a current location of each user account with a proximity sensing module of the corresponding user PC device; and,
   designating a plurality of specific accounts as the plurality of attendee accounts with the remote server, if the event session is designated as the public event session by the host account, and if the current location of each specific account is within a geofenced location of the public event session, wherein each specific account is from the plurality of user accounts.

7. The method of managing user engagement with a musical playlist, the method as claimed in claim 1 comprises the steps of:

providing the at least one host account as a plurality of host accounts, wherein a main host account from the plurality of host accounts is provided to execute steps (C) and (D);

prompting the main host account to select at least one cohost account with the corresponding host PC device before step (E), wherein the cohost account is from the plurality of host accounts; and, managing the event session between the main host account, the cohost account, and the plurality of attendee accounts through the remote server during step (E), if the cohost account is selected by the main host account.

8. The method of managing user engagement with a musical playlist, the method as claimed in claim 1 comprises the steps of:

prompting the host account to designate the event session as either a virtual event session or a venue event session before step (F); and, playing the current song during the event session with the corresponding user PC device of each attendee account during step (F), if the event session is designated as the virtual event session by the host account.

9. The method of managing user engagement with a musical playlist, the method as claimed in claim 1 comprises the steps of:

prompting the host account to designate the event session as either a virtual event session or a venue event session before step (F); and, playing the current song during the event session with the venue audio system during step (F), if the event session is designated as the venue event session by the host account, wherein the venue event session is associated to the venue audio system.

10. The method of managing user engagement with a musical playlist, the method as claimed in claim 1 comprises the steps of:

providing a plurality of music genres and a plurality of accessible songs managed by the remote server, wherein each accessible song is associated with a corresponding genre from the plurality of music genres;

prompting the host account to select at least one desired session genre for the event session with the corresponding host PC device before step (D), wherein the desired session genre is from the plurality of music genres;

prompting the host account to select at least one desired song with the corresponding host PC device during step (D), wherein the desired song is from the plurality of accessible songs; and, appending the desired song into the plurality of playlist songs with the remote server, if the desired song is selected by the host account, and if the corresponding genre of the desired song matches the desired session genre.

11. The method of managing user engagement with a musical playlist, the method as claimed in claim 1 comprises the steps of:

providing at least one third-party application managed by at least one external server, wherein the third-party application includes a plurality of accessible songs;

prompting the host account to select at least one desired song with the corresponding host PC device during step (D), wherein the desired song is from the plurality of accessible songs;

relaying the desired song from the external server to the remote server, if the desired song is selected by the host account; and, appending the desired song into the plurality of playlist songs with the remote server.

12. The method of managing user engagement with a musical playlist, the method as claimed in claim 1 comprises the steps of:

providing a plurality of accessible songs stored on the corresponding host PC device and/or the remote server;

prompting the host account to select at least one desired song with the corresponding host PC device during step (D), wherein the desired song is from the plurality of accessible songs; and, appending the desired song into the plurality of playlist songs with the remote server, if the desired song is selected by the host account.

13. The method of managing user engagement with a musical playlist, the method as claimed in claim 1 comprises the steps of:

tracking a current time with the remote server;

retrieving a session duration for the event session with the corresponding host PC device of the host account before step (E); and, executing steps (E) through (I), until the current time lapses the session duration.

14. The method of managing user engagement with a musical playlist, the method as claimed in claim 1 comprises the steps of:

providing a popularity score for each playlist song;

prompting each user account to enter an increment request or a decrement request for the popularity score of at least one specific song with the corresponding user PC device, wherein the specific song is from the plurality of playlist songs;

relaying the increment request or the decrement request from the corresponding user PC device of at least one arbitrary account to the remote server, if the increment request or the decrement request is entered by the arbitrary account, wherein the arbitrary account is any account from the plurality of attendee accounts;

increasing the popularity score of the specific song with the remote server, if the increment request is entered by the arbitrary account;

decreasing the popularity score of the specific song with the remote server, if the decrement request is entered by the arbitrary account; and, sequentially ordering the plurality of playlist songs based on the popularity score with the remote server before step (F).

15. The method of managing user engagement with a musical playlist, the method as claimed in claim 1 comprises the steps of:

prompting the participant account to enter a positive vote or a negative vote for the current song with the corresponding user PC device during step (G);

tallying the positive vote or the negative vote from each participant account into a total vote count with the remote server, if a positive vote or negative vote is entered by the participant account, and if the at least one participant account is a plurality of participant accounts; and, designating the total vote count as the feedback for the current song with the remote server.

16. The method of managing user engagement with a musical playlist, the method as claimed in claim 1 comprises the steps of:

providing the at least one participant account as a plurality of participant accounts;

providing a facial-expression recognition engine managed by the remote server;
capturing real-time visual data with a camera of the corresponding user PC device of each participant account during step (G);
executing the facial-expression recognition engine with the remote server by inputting the real-time visual data into the facial-expression recognition engine;
further executing the facial-expression recognition engine with the remote server by outputting a total count of positive facial expressions from the real-time visual data;
further executing the facial-expression recognition engine with the remote server by outputting a total count of negative facial expressions from the real-time visual data; and,
designating the total count of positive facial expressions and the total count of negative facial expressions as the feedback for the current song with the remote server.

17. The method of managing user engagement with a musical playlist, the method as claimed in claim 1 comprises the steps of:
providing the at least one participant account as a plurality of participant accounts;
providing a dancing recognition engine managed by the remote server;
capturing real-time movement data with an inertial measurement unit (IMU) of the corresponding user PC device of each participant account during step (G);
executing the dancing recognition engine with the remote server by inputting the real-time movement data into the dancing recognition engine;
further executing the dancing recognition engine with the remote server by outputting a total count of dance-related movements from the real-time movement data; and,
designating the total count of dance-related movements as the feedback for the current song with the remote server.

18. The method of managing user engagement with a musical playlist, the method as claimed in claim 1 comprises the steps of:
providing the at least one participant account as a plurality of participant accounts;
providing an audible-excitability recognition engine managed by the remote server;
capturing real-time audio data with a microphone of the corresponding user PC device of each participant account during step (G);
executing the audible-excitability recognition engine with the remote server by inputting the real-time audio data into the audible-excitability recognition engine;
further executing the audible-excitability recognition engine with the remote server by outputting an audible-excitability rating from the real-time audio data; and,
designating the audible-excitability rating as the feedback for the current song with the remote server.

19. The method of managing user engagement with a musical playlist, the method as claimed in claim 1 comprises the steps of:
tracking a current attendee count for the plurality of attendee accounts with the remote server; and,
designating the current attendee count as the feedback for the current song with the remote server.

20. The method of managing user engagement with a musical playlist, the method as claimed in claim 1 comprises the steps of:
providing a plurality of accessible songs managed by the remote server and the corresponding host PC device;
prompting the host account to replace at least one specific song for at least one new song with the corresponding host PC device after step (H), wherein the specific song is from the plurality of playlist songs, and wherein the new song is from the plurality of accessible songs;
deleting the specific song from the plurality of playlist songs with the remote server, if the specific song is selected to be replaced for the new song by the host account; and,
appending the new song into the plurality of playlist songs with the remote server, if the specific song is selected to be replaced for the new song by the host account.

* * * * *